(12) United States Patent
Sotani et al.

(10) Patent No.: US 8,276,472 B2
(45) Date of Patent: Oct. 2, 2012

(54) TRANSMISSION ASSEMBLY FOR POWER UNIT OF A VEHICLE, AND POWER UNIT INCORPORATING SAME

(75) Inventors: Hiroshi Sotani, Saitama (JP); Kinya Mizuno, Saitama (JP); Hiromi Sumi, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1111 days.

(21) Appl. No.: 12/218,746

(22) Filed: Jul. 17, 2008

(65) Prior Publication Data
US 2009/0025498 A1 Jan. 29, 2009

(30) Foreign Application Priority Data
Jul. 27, 2007 (JP) ................................. 2007-196164

(51) Int. Cl.
F16H 59/00 (2006.01)
F16H 61/00 (2006.01)
F16H 63/00 (2006.01)
(52) U.S. Cl. ..................................... 74/337.5
(58) Field of Classification Search .............. 74/329, 74/330, 331, 335, 337.5, 473.22, 473.24, 74/473.25, 473.28; 123/197.1
See application file for complete search history.

(56) References Cited

U.S. PATENT DOCUMENTS

| | | | | |
|---|---|---|---|---|
| 4,754,662 A | * | 7/1988 | Misawa | 74/473.22 |
| 5,542,309 A | * | 8/1996 | Wenger et al. | 74/337.5 |
| 5,934,234 A | * | 8/1999 | Shichinohe et al. | 123/90.31 |
| 5,975,041 A | * | 11/1999 | Narita et al. | 123/196 R |
| 7,059,210 B2 | * | 6/2006 | Thiessen et al. | 74/337.5 |
| 7,926,373 B2 | * | 4/2011 | Sotani et al. | 74/325 |
| 7,966,902 B2 | * | 6/2011 | Sotani et al. | 74/335 |
| 8,042,419 B2 | * | 10/2011 | Mizuno et al. | 74/337.5 |
| 8,051,733 B2 | * | 11/2011 | Mizuno et al. | 74/335 |
| 2007/0074593 A1 | * | 4/2007 | Mizuno et al. | 74/330 |

FOREIGN PATENT DOCUMENTS

| | | |
|---|---|---|
| JP | 2001-074139 | 3/2001 |
| JP | 2007-083263 | 4/2007 |

* cited by examiner

*Primary Examiner* — David D Le
*Assistant Examiner* — Michael Gonzalez
(74) *Attorney, Agent, or Firm* — Carrier Blackman & Associates, P.C.; Joseph P. Carrier; William D. Blackman

(57) ABSTRACT

A transmission assembly includes a shift drum operable to rotate in first and second directions. The shift drum includes a common speed change position, where both a fastest forward gear and a reverse gear are capable of becoming engaged, in such a manner that a reverse stopper arm fits at a first end of a reverse cam groove formed on the shift drum. When the shift drum is rotated in the second rotation direction, opposite to the first direction, from a state where the reverse gear is engaged, the reverse stopper arm surmounts the outer periphery of the shift drum from the first end of the reverse cam groove, without requiring the application of an external force thereto, so as to become detached and to move towards a second end of the reverse cam groove.

18 Claims, 18 Drawing Sheets

REVERSE AND FIFTH SPEED POSITION

REVERSE AND FIFTH SPEED POSITION

NEUTRAL POSITION

TRANSMISSION ASSEMBLY FOR POWER UNIT OF A VEHICLE, AND POWER UNIT INCORPORATING SAME

CROSS-REFERENCE TO RELATED APPLICATIONS

The present application claims priority under 35 USC §119 based on Japanese patent application No. 2007-196164, filed on Jul. 27, 2007. The entire subject matter of this priority document is incorporated by reference herein.

BACKGROUND OF THE INVENTION

1. Field of the Invention

The present invention relates to a transmission assembly for a power unit of a vehicle. More particularly, the present invention relates to a transmission assembly having a shift drum operable to select one of a reverse gear and a plurality of forward gears, the shift drum having a reverse cam groove formed thereon, and a reverse stopper arm urged by an urging member into the reverse cam groove, the reverse stopper arm requiring an external force overcoming the urging force of the urging member in order engage the reverse gear, and not requiring an external force in order to disengage the reverse gear.

2. Description of the Background Art

A transmission assembly for a power unit a vehicle, for example, such as disclosed in the Japanese Patent Publication Laid-open No. 2001-74139 is well known.

According a transmission assembly, as disclosed in the Japanese Patent Publication Laid-open No. 2001-74139, when a shift drum in a neutral position is rotated for establishing a reverse gear, an external force, resisting an urging force of a spring member, acts on the reverse stopper arm. The reverse stopper arm, therefore, detaches from the reverse cam groove and comes into contact with the outer periphery of the shift drum at both ends of the reverse cam groove.

The transmission assembly, as disclosed in the Japanese Patent Publication Laid-open No. 2001-74139, is large because the diameter of the shift drum has to be made large in order to increase the number of speed change positions set at the shift drum.

A disclosure of a transmission assembly (Japanese Patent Application No. 2007-083263), has already been submitted by applicant, in which common speed change positions establishing either a reverse gear or a fastest forward gear is set at the shift drum in order to prevent the shift drum from becoming large even if the number of speed change positions set at the shift drum increases.

When the transmission assembly, as disclosed in the Japanese Patent Publication Laid-open No. 2001-74139, is applied for preventing a shift drum from becoming large in diameter by establishing a common speed change position for either the reverse gear or the fastest forward gear, it is necessary to apply an external force acting on the reverse stopper arm in a direction opposite to that of the urging force to the reverse stopper arm, even when the shift drum is rotated, in order to establish a fastest forward gear.

The present invention has been made to overcome such drawbacks. Accordingly, it is one of the objects of the present invention to provide a transmission assembly where a common speed change position for establishing either a reverse gear or a fastest forward gear is set on a shift drum in order to prevent the diameter of the shift drum from becoming large, without reducing operativity of the transmission assembly.

SUMMARY OF THE INVENTION

In order to achieve the above objects, the present invention according to a first aspect thereof provides a transmission assembly having a shift drum operable to rotate in a first direction and a second direction so as to engage selected one of a reverse gear and a plurality of forward gears, the shift drum having a reverse cam groove formed at an outer periphery thereof, and extending in a circumferential direction of the shift drum, a reverse stopper arm. The reverse cam grove includes a first end and a second end situated at positions spaced in a circumferential direction of the shift drum. The reverse stopper arm is urged by an urging member into the reverse cam groove. In order to establish the reverse gear, the reverse stopper arm is moved from first end of the reverse cam groove to second end thereof by applying an external force, resisting urging force of the urging member, to the reverse stopper arm while the shift drum is rotated in a first rotation direction.

According to the first aspect of the present invention, the shift drum is set in such a manner that at a common speed change position, in which both the fastest forward gear of the plurality of forward gears and the reverse gear are capable of becoming engaged, the reverse stopper arm engages with said first end of the reverse cam groove. When the reverse gear is engaged, the shift drum rotates in a second rotation direction, which is opposite to the first rotation direction, and the reverse stopper arm is in a state in which external force does not act thereon, and is operable to surmount an outer periphery of the shift drum and the reverse stopper arm is detached from the first end of the reverse cam groove and moved towards the second end of the reverse cam groove.

The present invention according a second aspect thereof, in addition to the first aspect, is characterized in that an inclined guide surface is provided on a portion of the reverse stopper arm. The inclined guide surface enables the reverse stopper arm to surmount an end wall of the first end of the reverse cam groove and move to the side of the second end of the reverse cam groove when the shift drum rotates in a second rotation direction from a state where the reverse gear is engaged. The reverse stopper further includes an engaging surface that comes in contact with and engages with an end wall of the second end of the reverse cam groove when an external force does not act on the reverse stopper arm during rotation of the shift drum in the first rotation direction from a state where the reverse stopper arm fits with the other end of the reverse cam groove.

The present invention according to a third aspect thereof, in addition to the first and second aspects, is characterized in that the reverse stopper arm fits with the other end of the reverse cam groove when the shift drum is in a neutral position where none of the reverse gear and the plurality of forward gears are engaged.

Effects of the Invention

According to the first aspect of the present invention, the common speed change position for establishing either the fastest forward gear or the reverse gear is set at the shift drum. Therefore, it is possible to prevent the shift drum from becoming large in diameter even when the number of speed change positions set at the shift drum is increased. In order to establish the reverse gear, it is necessary to apply an external force to the reverse stopper arm during rotation of the shift drum in the first rotation direction.

The reverse stopper arm fits at one end of the reverse cam groove in a longitudinal direction at the common speed change position. When the shift drum is rotated in the second rotation direction, that is the opposite of the first rotation direction, from a state in which the reverse gear is engaged, the reverse stopper arm that is not acted upon by an external force surmounts the outer periphery of the shift drum from the first end of the reverse cam groove so as to detach and move to the second end of the reverse cam groove. Accordingly, it is not Accordingly, when the shift drum is rotated in the second rotation direction, it is not necessary to apply an external force opposite to the urging force applied to the reverse stopper arm for moving the reverse stopper arm from the first end to the second end of the reverse can groove. Such arrangement of prevents lowering operability of the transmission assembly.

According to the second aspect of the present invention, engagement of the reverse stopper arm with the other end wall of the reverse cam groove and the reverse stopper arm surmounting from first end of the reverse cam groove to the second end is possible with a straightforward structures, i.e., the inclined guide surface and the engaging surface, are provided at the reverse stopper arm.

According to the third aspect of the present invention, none of the reverse gear and the plurality of forward gears are engaged in a state where the reverse stopper arm is fitted at the second end of the reverse cam groove. The vehicle therefore does not advance even if the shift drum is rotated in the second direction from the engaged reverse gear position with no external force acting on the reverse stopper arm.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

The following is a description of exemplary embodiments of the present invention. Some selected illustrative embodiments of a transmission assembly for a power unit of a vehicle according to the present invention are depicted in the accompanying drawings as shown in FIGS. 1-20, and summarized in the preceding section.

Figure 1:
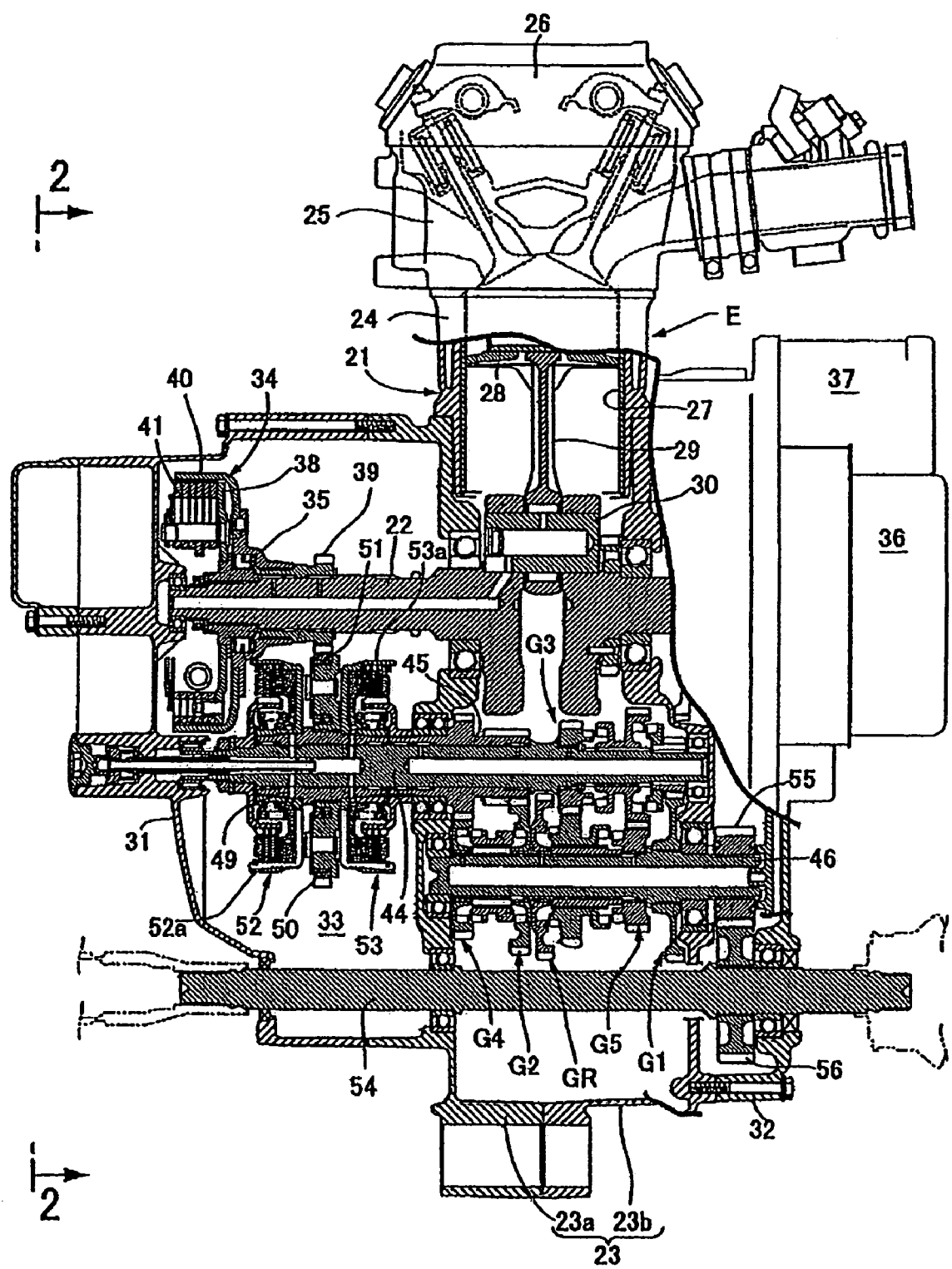
FIG. 1 is a vertical cross-sectional view of an engine body taken along line 1-1 of FIG. 2.

As shown in FIG. 1, an engine body 21 of an engine E mounted on, for example, an all-terrain vehicle (ATV) includes a crankcase 23 that rotatably supports a crankshaft 22 with an axis running along a widthwise direction of the vehicle, a cylinder block 24 coupled to an upper part of the crankcase 23, and a cylinder head 25 coupled to an upper part of the cylinder block 24. The engine body 21 also includes a head cover 26 coupled to an upper part of the cylinder head 25. A piston 28, slidably fitted in a cylinder bore 27 of the cylinder block 24, is connected to the crankshaft 22 via a connecting rod 29 and a connecting pin 30.

The crankcase 23 includes a pair of case halves 23a, 23b coupled in a plane orthogonal to a rotating axis of the crankshaft 22. First and second crankcase covers 31, 32 are respectively fastened to either end of the crankcase 23. A clutch housing 33 is formed between the crankcase 23 and the first crankcase cover 31.

One end of the crankshaft 22, projecting from the crankcase 23, is rotatably supported by the first crankcase cover 31. A centrifugal clutch 34 housed in the clutch housing 33 is installed at one end of the crankshaft 22 positioned in the vicinity of the first crankcase cover 31 via a one-way clutch 35. A generator (not shown) disposed between the crankcase 23 and the second crankcase cover 32 is coupled to the other end of the crankshaft 22 that projects from the crankcase 23. A recoil starter 36 is fitted to the second crankcase cover 32. A starter motor 37 for inputting starting power to the crankshaft 22 is fitted to the second crankcase cover 32.

The centrifugal clutch 34 includes a drive plate 38 fixed to the crankshaft 22, a bowl-shaped clutch housing 40 covering the drive plate 38 on the same axis so as to rotate together with a drive gear 39 fitted in a relatively rotatable manner to the crankshaft 22, and a clutch weight 41 axially supported in a rotatable manner at the drive plate 38 so as to be capable of engaging, as a result of friction, with the inner periphery of the clutch housing 40 according to an action of a centrifugal force accompanying rotation of the crankshaft 22. The one-way clutch 35 disposed between the clutch housing 40 and the drive plate 38 enables transmission of a drive force from the drive gear 39 to the crankshaft 22.

Figure 2:
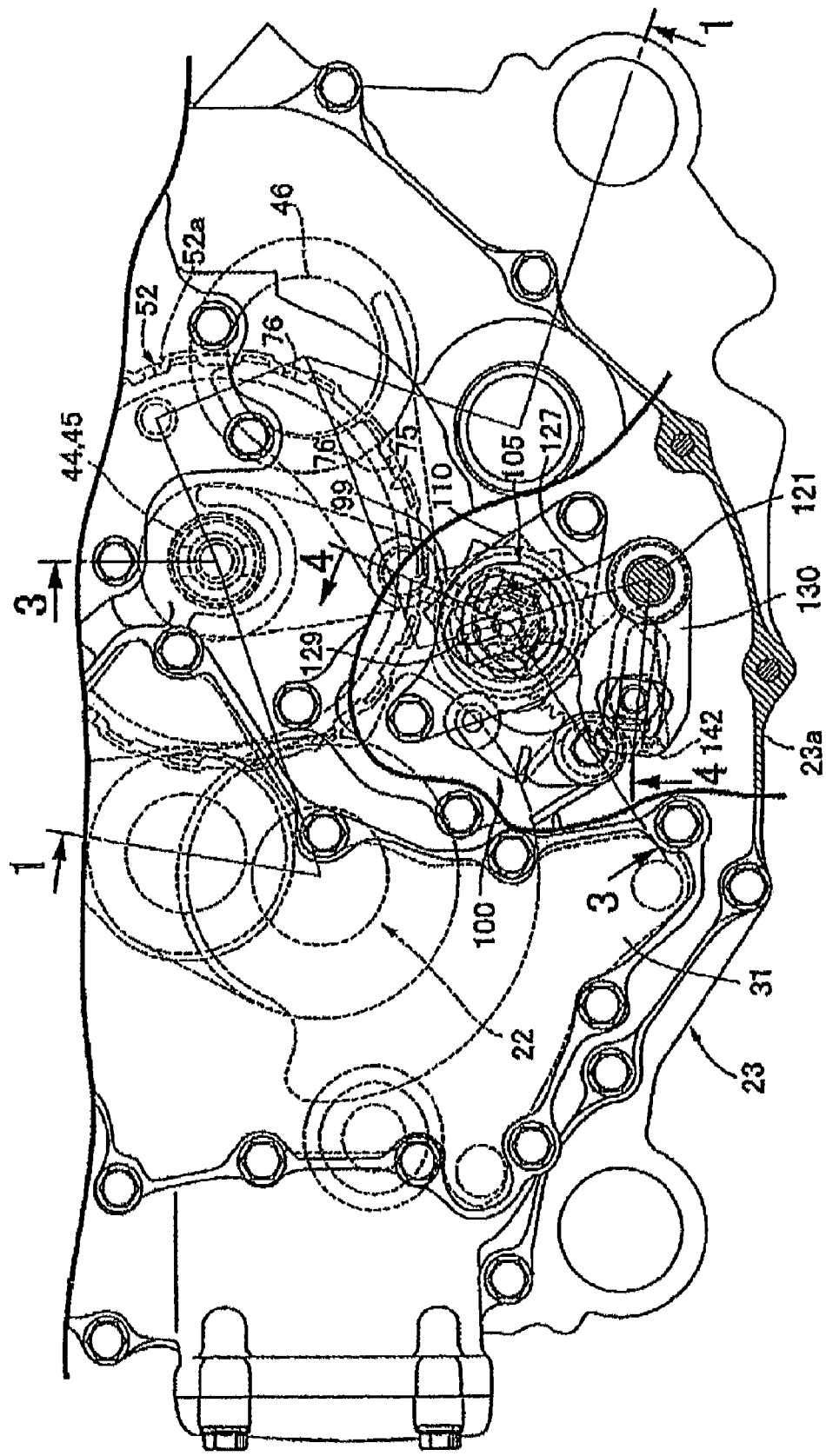
FIG. 2 is a partially cut-away side view as viewed from the direction of the arrows 2-2 of FIG. 1.
Figure 3:
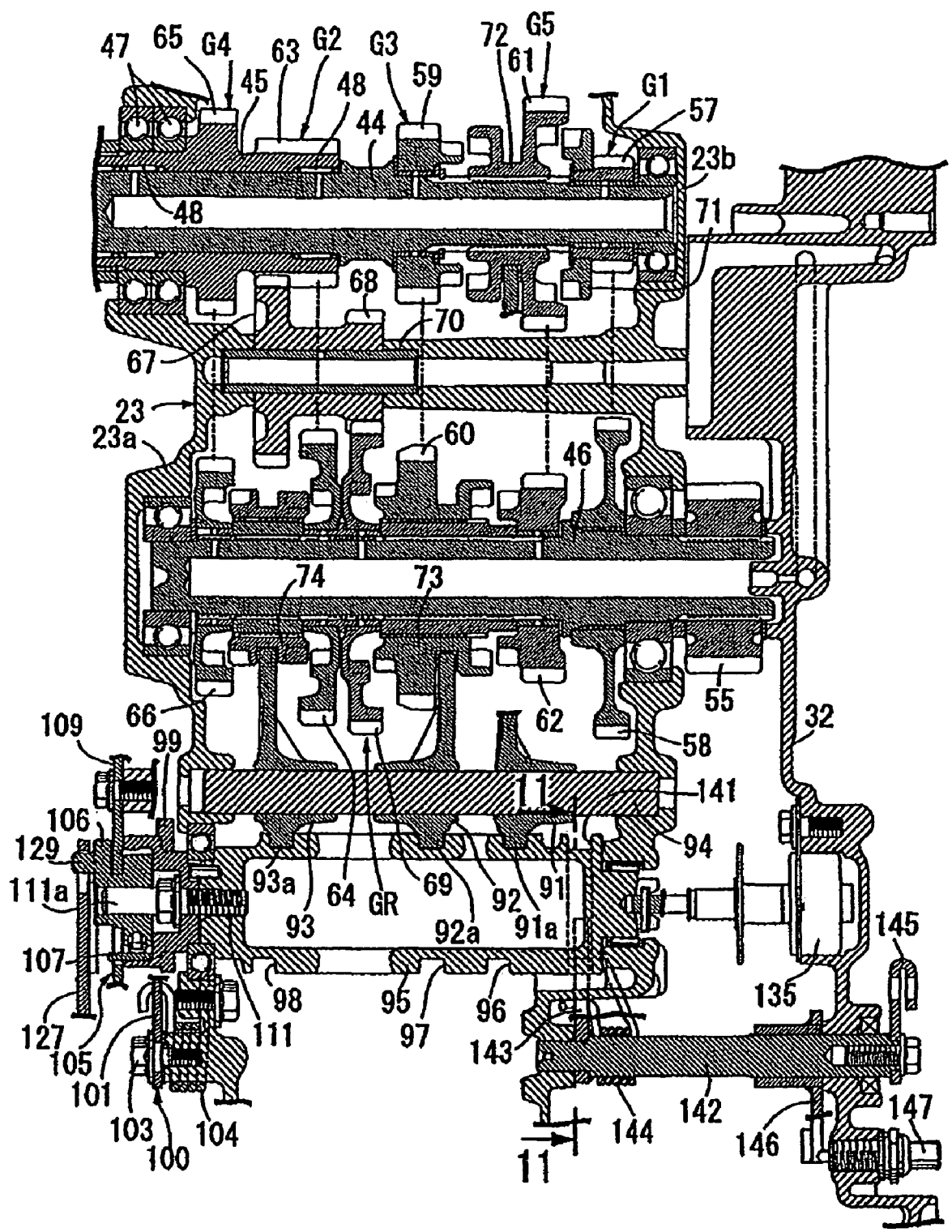
FIG. 3 is a cross-sectional view taken along line 3-3 of FIG. 2.

Referring to FIGS. 2 and 3, first and second main shafts 44, 45 disposed coaxially, so as to operable to rotate relatively on the same axis, are rotatably supported by the crankcase 23 in a manner enabling rotation about an axis parallel to the axis of rotation of the crankshaft 22, and a counter shaft 46 is similarly supported by the crankcase, in a manner so as to be parallel to the first and second main shafts 44, 45. A reverse gear GR and a plurality of forward gears, for example, first through fifth gears G1, G2, G3, G4 and G5 are provided in a manner where switching of gears is possible between the first and second main shafts 44, 45 and the counter shaft 46. A first gear G1, a third gear G3, and a fifth gear G5 are provided between the first main shaft 44 and the counter shaft 46. The second gear G2, the fourth gear G4, and the reverse gear GR are provided between the second main shaft 45 and the counter shaft 46.

Further, the first main shaft 44 passes concentrically in a relatively rotatable manner through the second main shaft 45, which is rotatably supported by the crankcase 23 via ball bearings 47, 47. A number of needle bearings 48 are interposed between the second main shaft 45 and the first main shaft 44.

As shown in FIG. 1, a cylindrical transmission shaft 49 is rotatably fitted with the first main shaft 44 within the clutch housing 33. Drive power from the engine is transmitted to a cylindrical transmission shaft 49 via the drive gear 39 rotatably fitted with the crankshaft 22, a driven gear 50 meshing with the drive gear 39, and a rubber damper 51. A first hydraulic clutch 52 is provided between the cylindrical transmission shaft 49 and the first main shaft 44. A second hydraulic clutch 53 is provided between the cylindrical transmission shaft 49 and the second main shaft 45.

A disc-shaped clutch outer 52a provided for the first hydraulic clutch 52 is rotatably supported at the cylindrical transmission shaft 49. As shown in FIG. 2, a number of equally spaced engaging recesses 75 extending in an axial direction for engaging a number of friction plates to make relative rotation not possible are provided in a circumferential direction at an inner periphery of the clutch outer 52a.

Oil run-off holes 76 are provided at the clutch outer 52a at a number of locations in the circumferential direction but avoiding the engaging recesses 75. By providing the oil run-off holes 76 while avoiding the engaging recesses 75, oil remains to as great an extent as possible within the engaging recesses 75. Accordingly, it is possible to alleviate noise resulting from contact between the clutch outer 52a and the friction plate. A clutch outer 53a of a second hydraulic clutch 53 is substantially similar to that the clutch outer 52a of the first hydraulic clutch 52.

When the first hydraulic clutch 52 is activated, rotational power is transmitted from the crankshaft 22 to the first main shaft 44, and subsequently to the counter shaft 46 via alternately selected the first, the third, and the fifth gears G1, G3, G5. When the second hydraulic clutch 53 is activated, rotational power is transmitted from the crankshaft 22 to the second main shaft 45, and subsequently to the counter shaft 46 via a gear train alternately selected from the second, fourth, and reverse gears G2, G4 and GR.

As shown in FIG. 1, an output shaft 54 coupled to a drive wheel (not shown) and having an axis parallel to the axis of rotation of the crankshaft 22 is rotatably supported by the second crankcase cover 32 and by the one case half 23a of the crankcase 23. Both the ends of the output shaft 54 come into close contact with the first and second crankcase covers 31, 32 so as to pass rotatably therethrough and to project outside the crankcase 23.

A drive gear 55 is fixed to the end of the counter shaft 46 projecting from the other case half 23b of the crankcase 23. A driven gear 56 meshing with the drive gear 55 is provided at the output shaft 54. In other words, the counter shaft 46 is coupled to the drive wheel via the drive gear 55, the driven gear 56, and the output shaft 54.

As shown in FIG. 3, the first gear G1 includes a first speed drive idler gear 57 rotatably supported on the first main shaft 44 so as to be fixed in an axial direction thereof, and a first speed driven gear 58 coupled to the counter shaft 46 in such a manner that relative rotation thereof is not possible. The first speed driven gear 58 meshes with the first speed drive idler gear 57.

The third gear G3 includes a third speed drive idler gear 59 rotatably supported on the first main shaft 44 so as to be fixed in an axial direction, and a third speed driven gear 60 coupled to the counter shaft 46 in such a manner that relative rotation thereof is not possible. The third speed driven gear 60 meshes with the third speed drive idler gear 59.

Further, the fifth gear G5 includes a fifth speed drive gear 61 disposed between the first and third speed drive idler gears 57, 59 in such a manner that sliding in an axial direction is possible, and coupled to the first main shaft 44 in such a manner that relative rotation is not possible, and a fifth speed driven idler gear 62 rotatably supported on the counter shaft 46 so that a position thereof in an axial direction is fixed. The speed driven idler gear 62 meshes with the fifth speed drive gear 61.

The second gear G2 includes a second speed drive gear 63 integrally formed on the second main shaft 45, and a second speed driven idler gear 64 rotatably supported on the counter shaft 46 so as to be in a fixed position in an axial direction. The second speed driven idler gear 64 meshes with the second speed drive gear 63.

The fourth gear G4 includes a fourth speed drive gear 65 integrally formed on the second main shaft 45, and a fourth speed driven idler gear 66 rotatably supported on the counter shaft 46 so as to be at a position fixed in an axial direction. The fourth speed driven idler gear 66 meshes with the fourth speed drive gear 65.

The reverse gear GR includes the second speed drive gear 63, a first reverse idler gear 67 meshing with the second speed drive gear 63, a second reverse idler gear 68 integrally formed with the first reverse idler gear 67, and a reverse driven idler gear 69 rotatably supported on the counter shaft 46 fixed at an axial direction position. The reverse driven idler gear 69 meshes with the second reverse idler gear 68. The integrated first and second reverse idler gears 67, 68 are rotatably supported on the reverse idle shaft 70. The reverse idle shaft 70 is supported at both ends thereof by the crankcase 23. The reverse idle shaft 70 has an axis parallel to the first main shaft 44, the second main shaft 45, and the counter shaft 46.

The ring-shaped engaged member 71 is fixed to an end portion of the third speed drive idler gear 59 side of the first speed drive idler gear 57.

A first shifter 72 is supported on the first main shaft 44 between the engaged member 71 and the third speed drive idler gear 59 so as to not be relatively rotatable but be slidable in an axial direction. The fifth speed drive gear 61 is provided integrally at the first shifter 72. The first shifter 72 is capable of sliding in an axial direction of the first main shaft 44 so as to switch to one of a position of engagement with the engaged member 71 so as to establish the first gear G1, a position of engagement with a third speed drive idler gear 59 so as to establish a third gear G3, and a center position (neutral position) where engagement takes place with neither of the first and third speed drive idler gears 57, 59.

The third speed driven gear 60 of the third gear G3 is provided integrally with a second shifter 73 in such a manner in which relative rotation thereof is not possible, but so as to be slidable in an axial direction, at the counter shaft 46 between the fifth speed driven idler gear 62 and the reverse driven idler gear 69. The second shifter 73 is held in a state of meshing with the third speed drive idler gear 59 and the third speed driven gear 60.

The second shifter 73 is operable to slide on the counter shaft 46 in an axial direction thereof between a position of engagement with the fifth speed driven idler gear 62 and a position of engagement with the reverse driven idler gear 69. When the second shifter 73 engages with the fifth speed driven idler gear 62 with the first shifter 72 in a neutral position, the fifth gear G5 is engaged.

A third shifter 74 is supported on the counter shaft 46 such that the third shifter 74 is not relatively rotatable but is operable to slide on the counter shaft 46 in an axial direction thereof between the second speed driven idler gear 64 and the fourth speed driven idler gear 66. The third shifter 74 is operable to slide in an axial direction of the counter shaft 46 so as to change between engagement positions thereof with the second speed driven idler gear 64 to establish a second gear G2, and with the fourth speed driven idler gear 66 to establish the fourth gear G4.

The third shifter is operable to shift to an intermediate position (a neutral position) where there is no engagement with either the second or the fourth driven idler gear 64, 66. The reverse gear GR is engaged when the second shifter 73 engages with the reverse driven idler gear 69 while the first and third shifters 72, 74 are in a neutral position.

Figure 4:
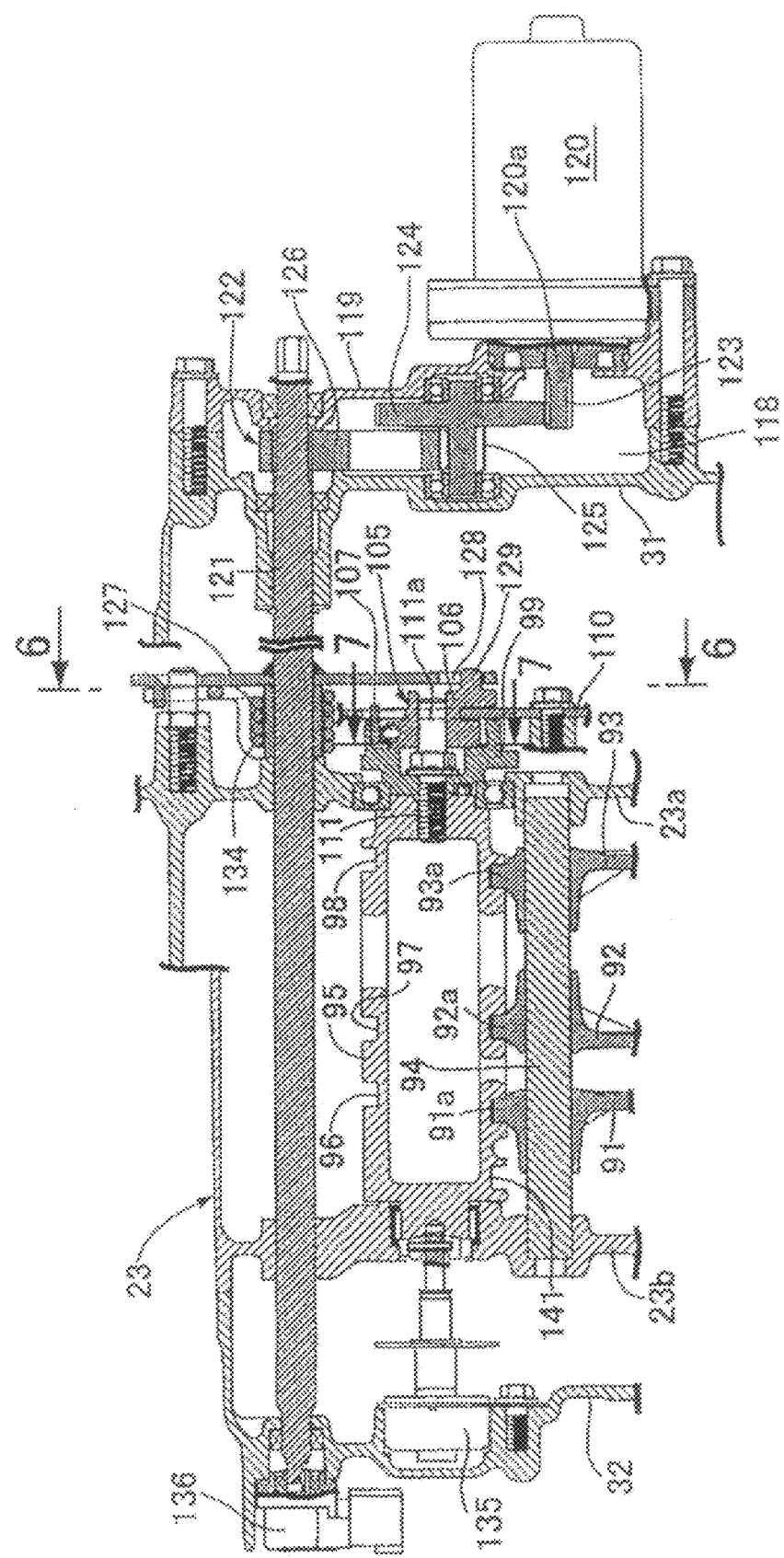
FIG. 4 is a cross-sectional view taken along line 4-4 of FIG. 2.

Referring to FIG. 4, the first, second and third shifters 72, 73, 74 are rotatably supported by the first, second and third shift forks 91, 92, 93, respectively. The axes of shift forks 91, 92, 93 are arranged parallel to the first and second main shafts 44, 45 and the counter shaft 46. The shift forks 91, 92, 93 are slidably supported by the shift fork shaft 94 (supported by the crankcase 23) in an axial direction of the shift fork shaft 94.

The shift drum 95 having an axis parallel to the first and second main shafts 44, 45 and the counter shaft 46 is rotatably supported about an axis at the crankcase 23. Shift pins 91a, 92a, 93a projecting at the first, second and third shift forks 91, 92, 93 engage in a slidable manner with first through third lead grooves 96, 97, 98 provided on an outer peripheral surface of the shift drum 95. When the shift drum 95 rotates, the first, second and third shift forks 91, 92, 93 slide in an axial direction according to patterns of first, second and third lead grooves 96, 97, 98.

Figure 5:
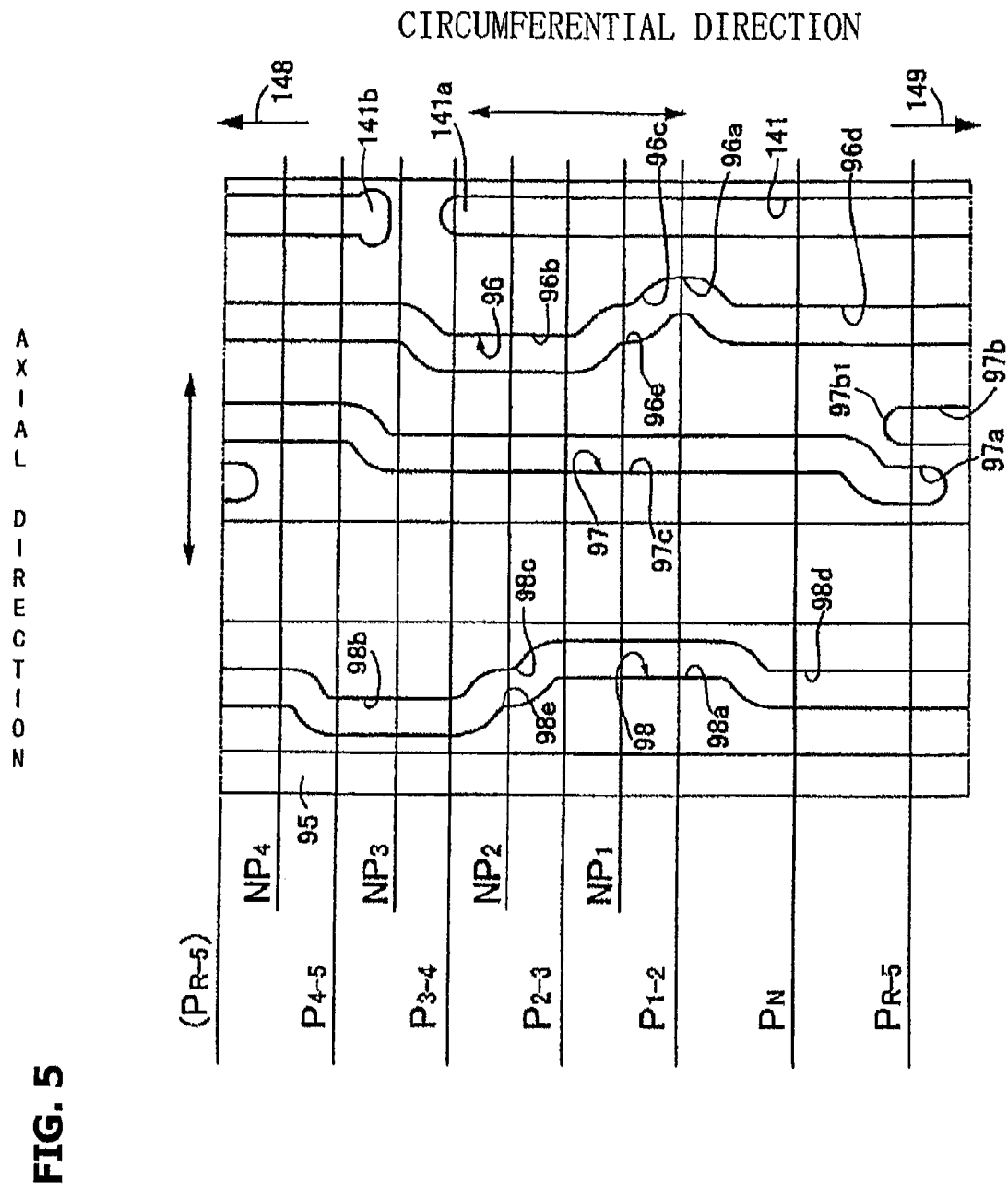
FIG. 5 is a developed view of an outer peripheral surface of a shift drum.

As shown in FIG. 5, the first lead groove 96 guides a sliding operation of the first shift fork 91 supporting the first shifter 72. The first lead groove 96 has a first gear establishing section 96a, a third gear establishing section 96b, a coupling section 96c, a neutral position section 96d, and a neutral section 96e.

The first gear establishing section 96a extends in a peripheral direction of the shift drum 95 so that the first shifter 72 engages with the engaged member 71 fixed at the first speed drive idler gear 57. The third gear establishing section 96b extends in a peripheral direction of the shift drum 95 and offset in an axial direction of the shift drum 95 from the first gear establishing section 96a so as to engage the first shifter 72 at the third speed drive idler gear 59. The coupling section 96c couples across the first and third gear establishing sections 96a, 96b. The neutral position section 96d holds the first shifter 72 in a neutral position.

The first lead groove 96 is provided so as to span the entire periphery of the shift drum 95. The neutral section 96e that supports the first shifter 72 in a position so as to release engagement thereof with the first and third speed drive idler gears 57, 59 is formed so as to extend slightly in a peripheral direction of the shift drum 95 at a central portion of the coupling section 96c.

Further, the second lead groove 97 guides a sliding operation of the second shift fork 92 that supports the second shifter 73. The second lead groove 97 has a reverse gear establishing section 97a, a fifth gear establishing section 97b and an intermediate position section 97c.

The reverse gear establishing section 97a extends in a peripheral direction of the shift drum 95 so that the second shifter 73 engages with the reverse driven idler gear 69. The fifth gear establishing section 97b extends in a peripheral direction of the shift drum 95 at a position offset in an axial direction of the shift drum 95 with respect to the reverse gear establishing section 97a so that the second shifter 73 engages with the fifth speed driven idler gear 62. The intermediate position section 97c supports the second shifter 73 at an intermediate position.

The second lead groove 97 is provided at the outer periphery of the shift drum 95 so as to continue in excess of one circumference of the shift drum 95 with both ends offset in a direction along an axis of the shift drum 95.

In other words, the second lead groove 97 is formed so that the reverse gear establishing section 97a of the side of one end of the second lead groove 97 running along a peripheral direction of the shift drum 95 and part of the fifth gear establishing section 97b on the side of the other end of the second lead groove 97 running in a peripheral direction of the shift drum 95 are mutually offset in an axial direction of the shift drum 95.

Moreover, as shown in FIG. 5, the second lead groove 97 is formed so as to gradually shift to one side along the axis of the shift drum 95 so as to give the intermediate position section 97c shifted to one side in an axial direction of the shift drum 95 from the reverse gear establishing section 97a in a direction from one end to the other end. The fifth gear establishing section 97b is offset to one side in an axial direction of the shift drum 95 from the intermediate position section 97c.

Further, the third lead groove 98 guides a sliding operation of a third shift fork 93 that supports the third shifter 74. The third lead groove 98 has a second gear establishing section 98a, a fourth gear establishing section 98b, a coupling section 98c, intermediate position section 98d, and a neutral section 98e.

The second gear establishing section 98a extends in a peripheral direction of the shift drum 95 so that the third shifter 74 engages with the second speed driven idler gear 64. The fourth gear establishing section 98b extends in a peripheral direction of the shift drum 95 at a position offset in an axial direction of the shift drum 95 with respect to the second gear establishing section 98a so that the third shifter 74 engages with the fourth speed driven idler gear 66. The coupling section 98c links the second and the fourth gear establishing sections 98a, 98b. The intermediate position section 98d supports the third shifter 74 in an intermediate position.

The third lead groove 98 is provided so as to span the entire periphery of the shift drum 95. The neutral section 98e is formed at a central section of the coupling section 98c so as to extend slightly in a peripheral direction of the shift drum 95. The neutral section 98e supports the third shifter 74 in a position where engagement with the second and fourth speed driven idler gears 64, 66 is released.

The shift drum 95 sets a number of gear positions spaced in a peripheral direction. In an embodiment, each gear position of common gear positions of reverse and fifth gear position $P_{R-5}$, neutral position $P_N$, first and second speed positions $P_{1-2}$, second and third speed positions $P_{2-3}$, third and fourth speed positions $P_{3-4}$, and fourth and fifth speed positions $P_{4-5}$ are sequentially set spaced at sixty-degree intervals.

In the reverse and fifth speed position $P_{R-5}$, it is possible to establish the reverse gear GR and the fifth gear position G5 that is the fastest forward gear. Namely, it is possible for the shift pins 91a, 93a of the first and third shift forks 91, 93 to engage with the neutral position sections 96d, 98d of the first and third lead grooves 96, 98, respectively.

It is also possible for the shift pin 92a of the second shift fork 92 to engage with one of the reverse gear establishing section 97a of the second lead groove 97 and the fifth gear establishing section 97b. Further, in the neutral position $P_N$, the shift pins 91a, 92a, 93a of the respective first, second and third shift forks 91 to 93 engage with the neutral position sections 96d, 97c, 98d of the first, second and third lead grooves 96, 97, 98 so that none of the gears G1, G2, G3, G4, G5, or GR are engaged.

In the first and second speed positions $P_{1-2}$, the shift pin 91a of the first shift fork 91 engages with the first gear establishing section 96a of the first lead groove 96, the shift pin 92a of the second shift fork 92 engages with the intermediate position 97c of the second lead groove 97, and the shift pin 93a of the third shift fork 93 engages with the second gear establishing section 98a of the third lead groove 98. The first and second gears G1, G2 are thus temporarily both engaged.

In the second and third speed positions $P_{2-3}$, the shift pin 91a of the first shift fork 91 engages with the third gear establishing section 96b of the first lead groove 96, the shift pin 92a of the second shift fork 92 engages with the intermediate position section 97c of the second lead groove 97, and the shift pin 93a of the third shift fork 93 engages with the second gear establishing section 98a of the third lead groove 98. The second and third gears G2, G3 are thus engaged.

In the third and fourth speed positions $P_{3-4}$, the shift pin 91a of the first shift fork 91 engages with the third gear establishing section 96b of the first lead groove 96, the shift pin 92a of the second shift fork 92 engages with the intermediate position section 97c of the second lead groove 97, and the shift pin 93a of the third shift fork 93 engages with the fourth gear establishing section 98b of the third lead groove 98. The third and fourth gears G3, G4 are thus engaged.

In the fourth and fifth speed positions $P_{4-5}$, the shift pin 91a of the first shift fork 91 engages with a central position 96d of the first lead groove 96, the shift pin 92a of the second shift fork 92 engages with the fifth gear establishing section 97b of the second lead groove 97, and the shift pin 93a of the third shift fork 93 engages with the fourth gear establishing section 98b of the third lead groove 98. The fourth and fifth gears G4, G5 are thus temporarily both engaged.

In other words, during shifting up of gear positions, it is possible to establish a high-speed-side gear in advance before switching to that higher gear position. It is also possible to establish a low-speed-side gear train in advance before switching to a low gear when shifting down.

A first neutral position $NP_1$ temporarily holds the first shifter 72 in a neutral position while switching the engaged states of the first gear G1 and the third gear G3. The first neutral position $NP_1$ is provided between the first main shaft 44 and the counter shaft 46, and is set at a central portion between the first and second speed positions $P_{1-2}$ and the second and third speed positions $P_{2-3}$ along a peripheral direction of the shift drum 95. The neutral section 96e of the first lead groove 96 is disposed at the first neutral position $NP_1$.

Further, a second neutral position $NP_2$ temporarily holds the third shifter 74 in a neutral position while changing the state of establishment of the second gear G2 and the fourth gear G4. The second neutral position $NP_2$ is provided between the second main shaft 45 and the counter shaft 46 at a central portion of the second and third speed positions $P_{2-3}$ and the third and fourth speed positions $P_{3-4}$ along a peripheral direction of the shift drum 95. The neutral section 98e of the third lead groove 98 is disposed at the second neutral position $NP_2$.

A third neutral position $NP_3$ supports the first shifter 72 in a neutral position while switching the engaged states of the third gear G3 and the fifth gear G5. The third neutral position $NP_3$ is provided between the first main shaft 44 and the counter shaft 46 and is set at a central portion between the third and fourth speed positions $P_{3-4}$ and the fourth and fifth speed positions $P_{4-5}$ along a circumferential direction of the shift drum 95.

The fourth neutral position $NP_4$ for holding the first and third shifters 72, 74 in a neutral position while switching the state of establishment of the third gear G3 and the fifth gear G5 is set between the fourth and fifth speed positions $P_{4-5}$ and the fifth speed position $P_{R-5}$.

Figure 6:
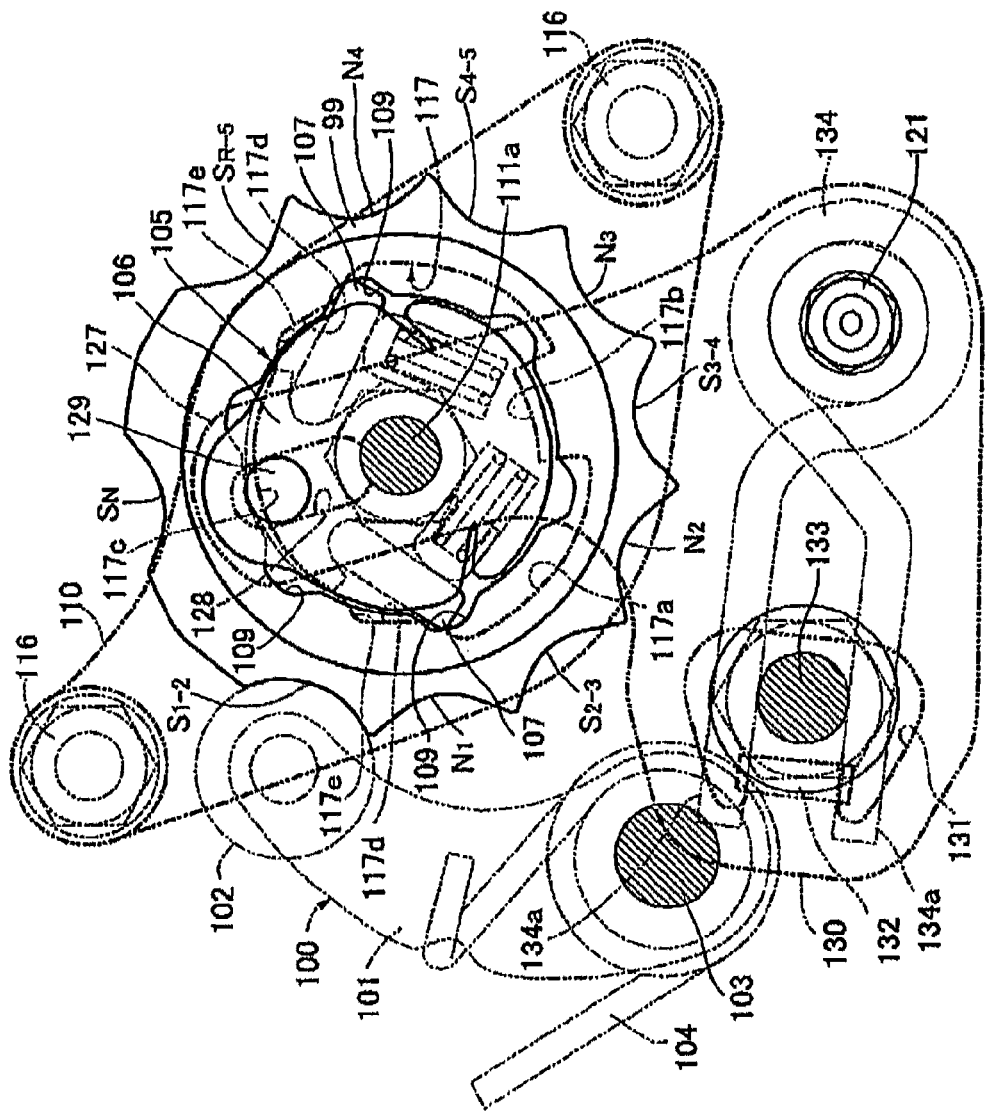
FIG. 6 is an enlarged cross-sectional view taken along line 6-6 of FIG. 4 of a first speed driving state.
Figure 7:
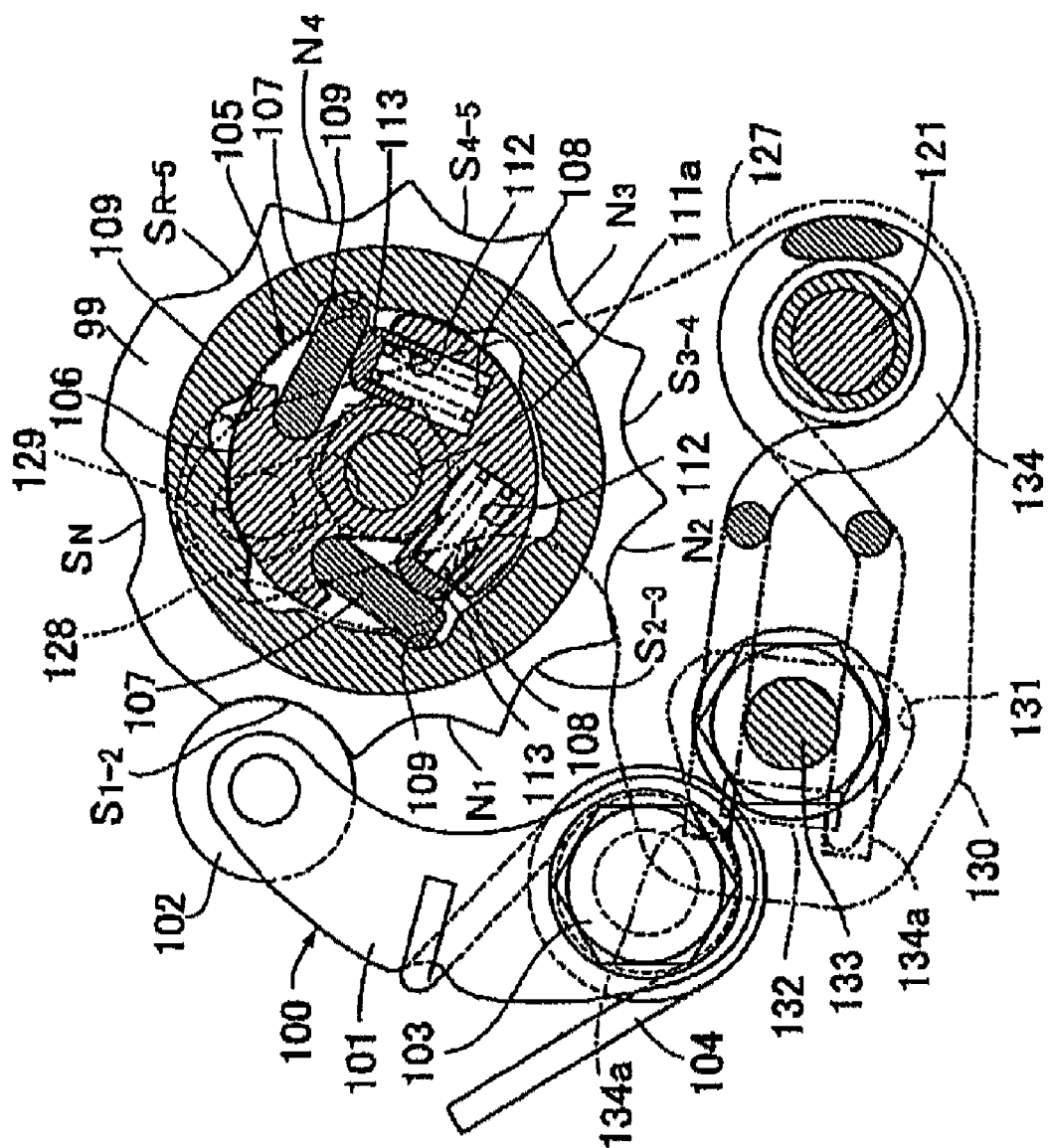
FIG. 7 is an enlarged cross-sectional view taken along line 7-7 of FIG. 4 of a first speed driving state.

Referring to FIGS. 6 and 7, a shift drum center 99 rotating together with the shift drum 95 is fixed using a coaxial bolt 111 to an end portion of the shift drum 95.

In order to selectively establish the one of first through fifth gears G1, G2 G3, G4 and G5 and the reverse gear GR a plurality of notches—i.e., a reverse and fifth speed positioning notch $S_{R-5}$, a neutral positioning notch $S_N$, a first and second speed positioning notch $S_{1-2}$, a second and third speed positioning notch $S_{2-3}$, a third and fourth speed positioning notch $S_{3-4}$, and a fourth and fifth speed deciding notch $S_{4-5}$, corresponding to each of the positions of the reverse and fifth speed position $P_{R-5}$, the neutral position $P_N$, the first and second speed positions $P_{1-2}$, the second and third speed positions $P_{2-3}$, the third and fourth speed positions $P_{3-4}$, and the fourth and fifth speed positions $P_{4-5}$ set by the shift drum 95—are equidistantly spaced from each other at an outer periphery of the shift drum center 99.

In one embodiment of the present invention, each notch $S_{R-5}$, $S_N$, $S_{1-2}$, $S_{2-3}$, $S_{3-4}$, $S_{4-5}$, is provided on the outer periphery of the shift drum center 99 spaced from each other at intervals of sixty degrees.

However, neutral notches $N_1$, $N_2$, $N_3$, $N_4$ individually corresponding to the first through fourth neutral positions $NP_1$, $NP_2$, $NP_3$, $NP_4$ are provided at the outer periphery of the shift drum center 99 at central portion mutually between the first and second speed positioning notch $S_{1-2}$, the second and third speed positioning notch $S_{2-3}$, the third and fourth speed positioning notch $S_{3-4}$, and the reverse and fifth speed positioning notch $S_{R-5}$.

Each of the notches $S_{R-5}$, $S_N$, $S_{1-2}$, $S_{2-3}$, $S_{3-4}$, $S_{4-5}$, $N_1$, $N_2$, $N_3$, and $N_4$ provided on the shift drum center 99 are selectively engaged by a drum stopper arm 100. The drum stopper arm 100 includes an arm 101 and a roller 102 axially supported at a tip of the arm 101. The arm 101 includes a base axially rotatably supported at the case half 23a of the crankcase 23 by a spindle 103 having an axis parallel to the axes of the shift drum 95 and the shift drum center 99.

The roller 102 is operable to engage with one of each of the notches $S_{R-5}$, $S_N$, $S_{1-2}$, $S_{2-3}$, $S_{3-4}$, $S_{4-5}$, $N_1$, $N_2$, $N_3$, and $N_4$. Each of the notches $S_{R-5}$, $S_N$, $S_{1-2}$, $S_{2-3}$, $S_{3-4}$, $S_{4-5}$, $N_1$, $N_2$, $N_3$, and $N_4$ is formed as a circular arc in order to stabilize the state of engagement of the roller 102.

A torsion spring 104 is provided between the base end of the arm 101 and the case half 23a of the crankcase 23. The arm 101 of the drum stopper arm 100 is urged in the direction of the rotational center of the shift drum center 99 by spring force exhibited by the torsion spring 104 in order to engage roller 102 with one of the notches $S_{R-5}$, $S_N$, $S_{1-2}$, $S_{2-3}$, $S_{3-4}$, $S_{4-5}$, $N_1$, $N_2$, $N_3$, and $N_4$.

The shift drum center 99 may be sequentially rotatably driven by a predetermined angle (in this embodiment, by sixty degrees) by a drive system 105. The drive system 105 includes a drum shifter 106, a pair of pawls 107, 107, a pair of springs 108, 108, the shift drum 95 having engaging recesses 109, 109, a fixed guide 110, and a shift operation motor 120.

The drum shifter 106 is operable to rotate about an axis coaxial with the shift drum center 99 and at least partially disposed within the shift drum center 99. The pair of pawls 107, 107 is fitted symmetrically to the drum system so as to collapse in a radial direction of the drum shifter 106. The pair of springs 108, 108 urges the pawls 107, 107 in a standing direction. The engaging recesses 109, 109 are provided equally spaced in a circumferential direction at an inner periphery of the shift drum center 99 so as to be capable of engaging with the pawls 107. The fixed guide plate 110 that guides the pawls 107, 107 to a standing state in response to rotation of the drum shifter 106. The shift operation motor 120 provides rotational force to the drum shifter 106.

The drum shifter 106 is supported by a shaft 111a provided with a coaxial bolt that coaxially couples the shift drum center 99 with an end of the shift drum 95 in a rotatable manner about an axis coaxial with the shift drum center 99. A large portion of the drum shifter 106 that partially projects outwardly from the shift drum center 99 is arranged so as to be relatively rotatable within the shift drum center 99.

The springs 108, 108 are provided in a compressed state between closed ends of housing recesses 112, 112 provided at an outer peripheral section of the drum shifter 106 and lifters 113, 113 in the shape of cylinders with bottoms inserted so as to be capable of sliding at the housing recesses 112, 112 so as to come into contact with the ends of the pawls 107. The pawls 107, 107 are urged in a standing direction by the springs 108, 108. The ends of the pawls 107 project from the outer periphery of the drum shifter 106 when the pawls 107 are standing, and are in substantially the same position as the outer periphery of the drum shifter 106 when sitting down.

A number (in this embodiment, six) of engagement recesses 109, 109 are provided spaced equally in a circumferential direction at the inner periphery of the shift drum center 99. The ends of the pawls 107 are operable to selectively engage with the two engaging recesses 109, 109 at positions sandwiched by two corresponding engaging recesses 109, 109 of the engaging recesses 109 in a state where the drum stopper arm 100 engages with one of the reverse and fifth speed positioning notch $S_{R-5}$, the neutral positioning notch $S_N$, the first and second speed positioning notch $S_{1-2}$, the second and third speed positioning notch $S_{2-3}$, the third and fourth speed positioning notch $S_{3-4}$, and the fourth and fifth speed positioning notch $S_{4-5}$.

The guide plate 110 is fastened to the case half 23a of the crankcase 23 by a pair of bolts 116, 116 at a position where the shift drum center 99 is sandwiched between the case halves 23a, 23b of the crankcase 23. A guide hole 117 corresponding to the drum shifter 106 is formed in the guide plate 110.

The guide hole 117 has a large diameter circular arc section 117a formed with a larger diameter than the outer periphery of the drum shifter 106 taking an axis of rotation of the shift drum center 99 and the drum shifter 106, i.e., an axis of the shaft 111a as a center, a restricting projection 117b projecting further inwards than the outer periphery of the drum shifter 106 from a central section of the large diameter circular arc section 117a, a small diameter arc section 117c formed with a smaller diameter than the outer periphery of the drum shifter 106 taking an axis of the shaft 111a as a center, and coupling sections 117d, 117d that link between the ends of the large diameter circular arc section 117a and the ends of the small diameter circular arc section 117c.

A length in a circumferential direction of the large diameter circular arc section 117a is set substantially equal to a corresponding length between the two engaging recesses 109 which engage with ends of the pawls 107.

The coupling sections 117d come into contact with the pawls 107 when the pawls 107 are engaged with the engaging recesses 109, 109 move to the side of the small diameter arc section 117c in response to rotation of the drum shifter 106, and are formed having a stepped part 117e in the center that pushes the pawls 107, 107 to a collapsed side. The stepped parts 117e are disposed to the outside from the inside periphery of the shift drum center 99.

Further, the restricting projection 117b is formed so as to come into contact with the tip of one of the pawls 107, 107 in accordance with a one time rotation so that the drum shifter 106 is temporarily stopped midway in response to the action of the shift operation motor 120 temporarily stopping midway during operation thereof. The restricting projection 117b, therefore, restricts rotation of the drum shifter 106.

As shown in FIG. 4, a cover 119 that forms a deceleration mechanism chamber 118 with the first crankcase cover 31 is fastened to the first crankcase cover 31. The shift operation motor 120 is fitted to the cover 119. The shift operation motor 120 has an axis of rotation parallel to the shift drum 95 and is fitted to the cover 119 so that an output shaft 120a of the motor 120 projects into the deceleration mechanism chamber 118.

On the other hand, a change shaft 121 having an axis parallel to the shift drum 95 is disposed so as to pass through the first crankcase cover 31, the cover 119 and the second crankcase cover 32 in a freely rotatable manner. A gear reduction mechanism 122 disposed between the output shaft 120a and the change shaft 121 is housed in the deceleration mechanism chamber 118.

The gear reduction mechanism 122 includes a drive gear 123 provided integrally at the output shaft 120a of the shift operation motor 120 within the deceleration mechanism chamber 118, a first intermediate gear 124 meshing with the drive gear 123, a second intermediate gear 125 rotating integrally with the first intermediate gear 124, and a driven sector gear 126 fixed to the side of one end of the change shaft 121 within the deceleration mechanism chamber 118 and meshing with the second intermediate gear 125. Rotational force of the shift operation motor 120 is reduced by the gear reduction mechanism 122 and transmitted to the change shaft 121.

A change arm 127 is fixed to the change shaft 121, with a base end fixed to the change shaft 121 and extending to the side of the drum shifter 106 along a radial direction of the change shaft 121. An engaging pin 129 disposed on the drum shifter 106 engages with a long hole-shaped engaging hole 128 provided at the change arm 127 extending in a lengthwise radial direction of the change shaft 121 at a position offset from the axis of rotation of the drum shifter 106.

An arm 130 extending in a radial direction of the change shaft 121 is provided so as to continue on, in an integral manner, at a base end of the change arm 127. A circular arc-shaped long hole 131 having the axis of the change shaft 121 as a center is provided at an end of the arm 130. A projection 132 is positioned on a straight line linking the center in a circumferential direction of the long hole 131 and the change shaft 121.

On the other hand, a pin 133 that is inserted through the long hole 131 is disposed on the case half 23a of the crankcase 23. A pinching spring 134 is disposed between the change arm 127 and the arm 130, and the case half 23a of the crankcase 23 so as to surround the change shaft 121. The pinching spring 134 includes a pair of pinching arms 134a, 134a that sandwich the projection 132 and the pin 133 from both sides.

The change arm 127 and the arm 130 are urged towards a center position so that the projection 132 and the pin 133 are lined up on a straight line between a center in a circumferential direction of the long hole 131 and an axis of the change shaft 121.

The following is a description of a case where shifting up to second gear when driving in first gear, i.e. a state where the drum stopper arm 100 is engaged with the first and second speed positioning notches $S_{1-2}$ of the shift drum center 99, the first hydraulic clutch 52 is engaged, and the second hydraulic clutch 53 is disengaged, the change shaft 121 and the change arm 127 rotate in a clockwise direction (see FIG. 6), according to the operation of the shift operation motor 120.

The drum shifter 106 of the drive unit 105 is displaced at the change shaft 121 with the engaging pin 129 within the engaging hole 128 as a result of the engaging pin 129 engaging with the long hole 128 of the change arm 127, so as to rotate in a clockwise direction (see FIG. 6).

One of the pawls 107, 107 is engaged with the two engaging recesses 109, 109 such that a portion corresponding to the large diameter circular arc section 117a of the guide hole 117 of the guide plate 110 rotates about an axis of the shaft 111a so that the shift drum center 99 rotates in a clockwise direction (see FIG. 6).

Figure 8:
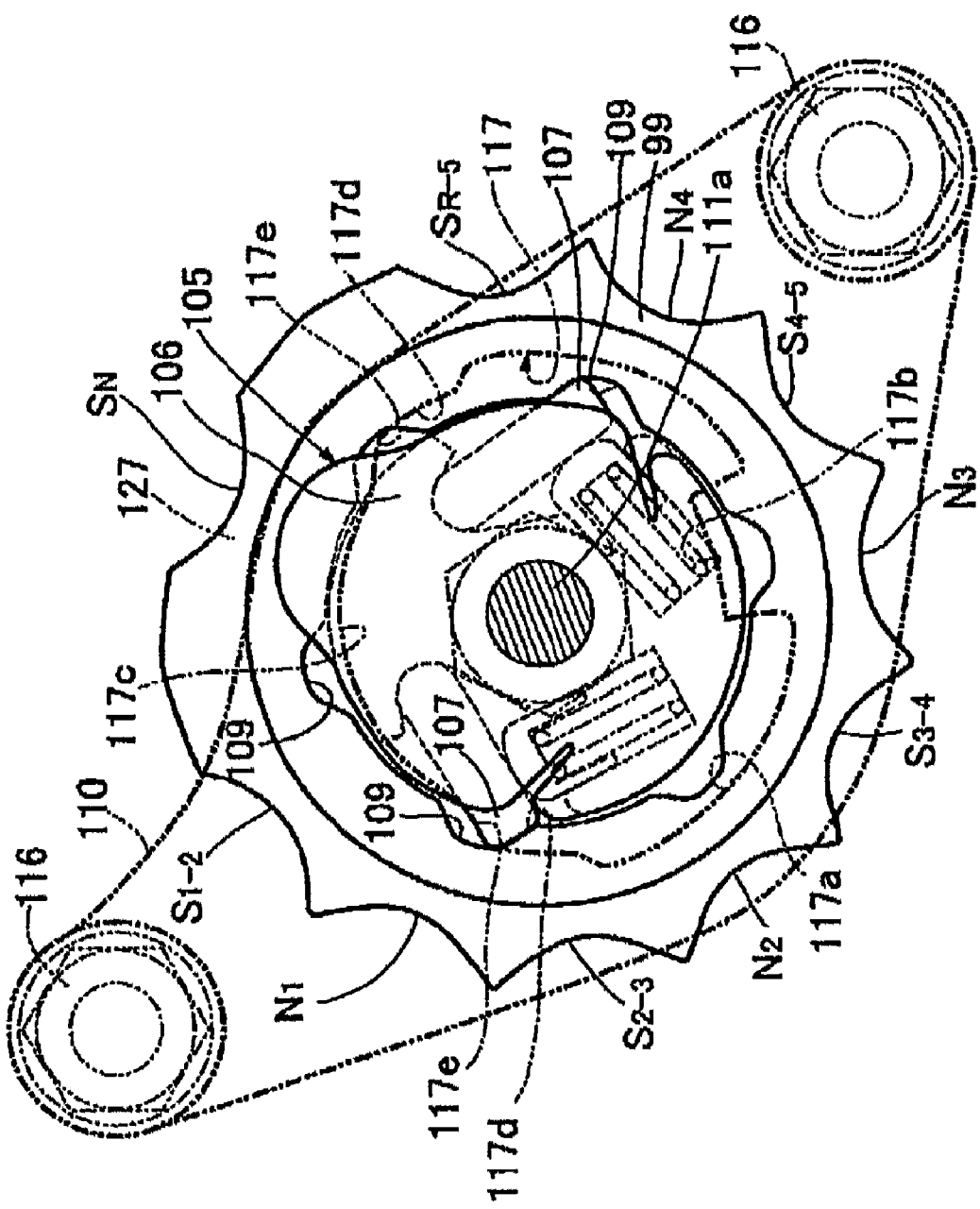
FIG. 8 is a view showing a state of part of a drive unit midway through rotation of the shift drum center.

There are also cases where the shift drum 95 rotates in advance during rotational driving of the shift drum 95. However, during such advance rotation of the shift drum 95, as shown in FIG. 8, the remaining pawl 107 (i.e., the pawl not pressing the shift drum center 99) comes in contact with the stepped section 117e at an intermediate section of the coupling section 117d of the guide hole 117. The advance rotation of the shift drum 95 is paused as a result of the other pawl 107 coming into contact and engaging with the engaging recess 109.

Figure 9:
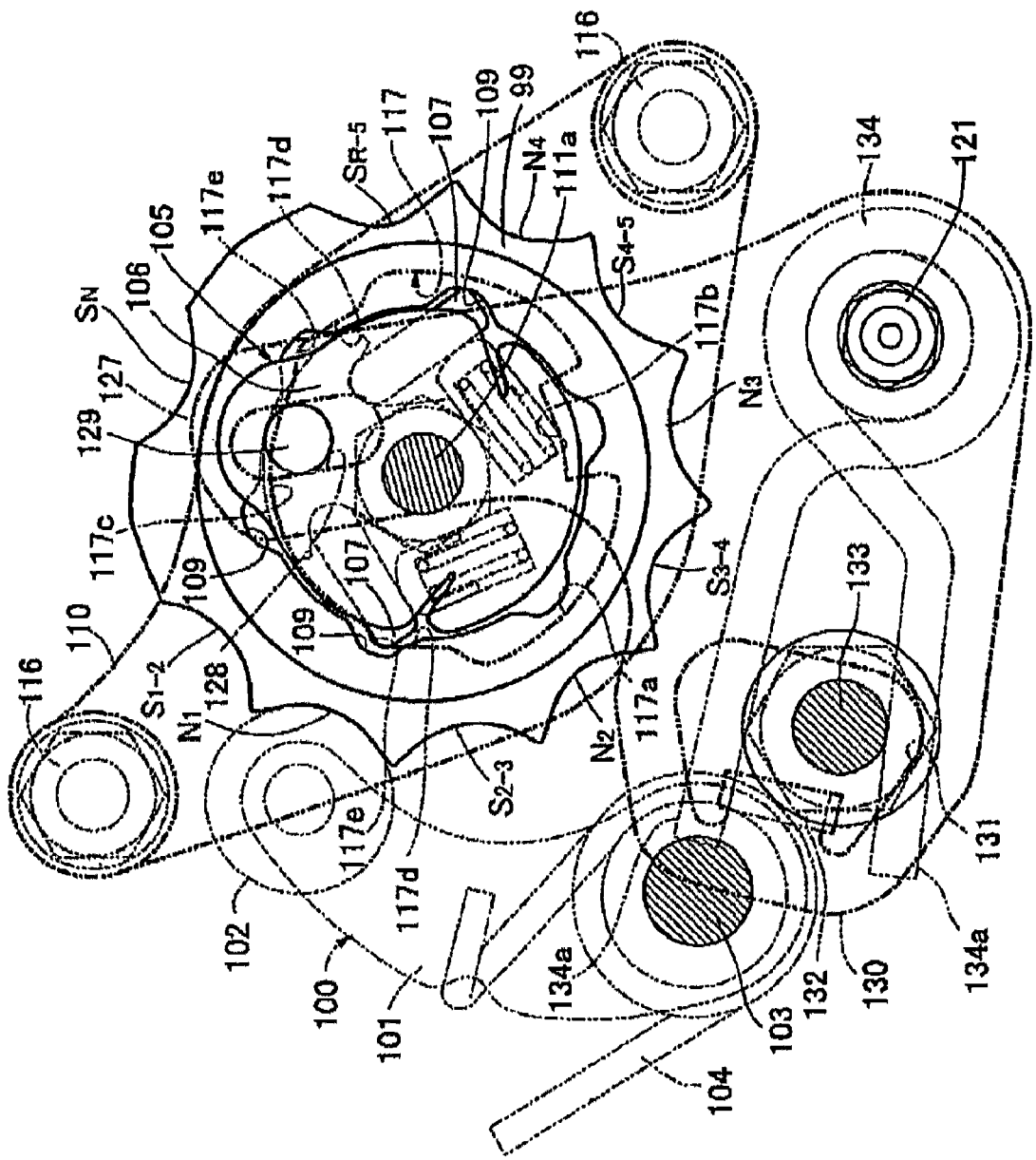
FIG. 9 is a view corresponding to FIG. 6 in a state in the middle of shifting up from a first speed driving state to a second speed driving state.

In this situation, as shown in FIG. 9, the roller 102 of the drum stopper arm 100 rides over a raised section between the first and second speed positioning notch $S_{1-2}$ and the neutral notch $N_1$ so as to engage with the neutral notch $N_1$.

Therefore, it is possible to reliably obtain a neutral position for the shift drum 95. Further, when the drum shifter 106 rotates, the other pawl 107 rotates so as to be collapsed to the inside by the step section 117e. The roller 102 of the drum stopper arm 100 surmounts a raised section between the neutral notch $N_1$ and the second and third speed positioning notch $S_{2-3}$.

The end of the other pawl 107 then comes in a slidable contact with the small diameter arc section 117c of the guide hole 17 at the guide plate 110 as a result of further rotation of the drum shifter 106. When the drum shifter 106 is rotated to an extent to surmount a raised section between the neutral notch $N_1$ and the second and third speed positioning notch $S_{2-3}$, the operation of the shift operation motor 120 is halted.

Figure 10:
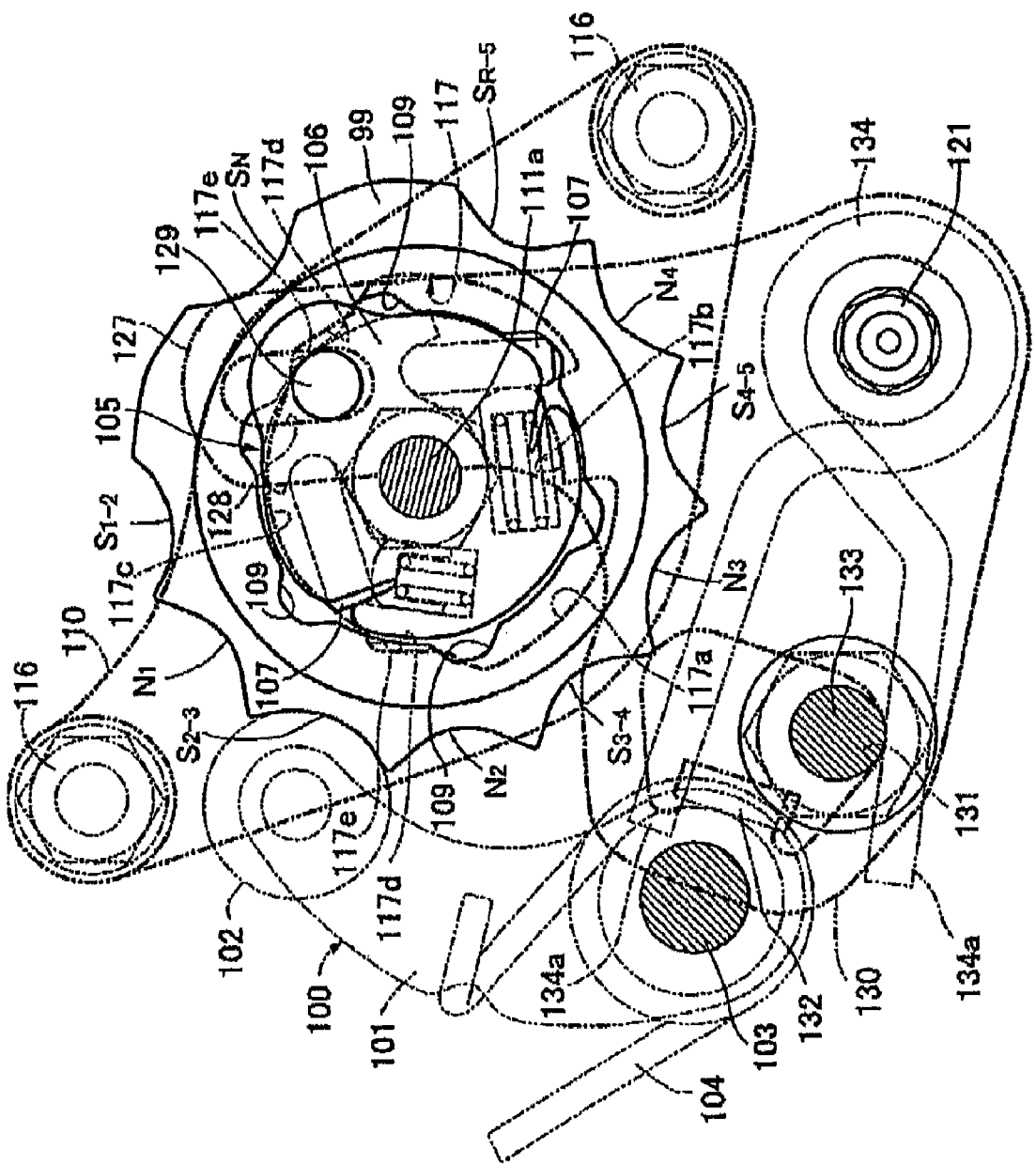
FIG. 10 is a view corresponding to a second speed driving state of FIG. 6.

As shown in FIG. 10, the shift drum center 99 is rotated until the roller 102 of the drum stopper arm 100 engages with the second and third speed positioning notch $S_{2-3}$. In other words, it is preferable that the shift operation motor 120 exhibits a force rotating the drum shifter 106 by an interval between the first and second speed positioning notch $S_{1-2}$ and the second and third speed positioning notch $S_{2-3}$ of sixty degrees or less, for example, 53.7 degrees.

The drive unit 105 gently and temporarily lowers the rotational speed of the shift drum 95 midway between shifting up from first gear to second gear. The action of the drive unit 105 is the same at the time of shifting up from second speed to third speed, shifting up from third speed to fourth speed, shifting up from fourth speed to fifth speed, and shifting down from fifth speed to fourth speed, shifting down from fourth speed to third speed, shifting down from third speed to second speed, and shifting down from second speed to first speed.

The roller 102 of the drum stopper arm 100 engages with the reverse and fifth speed positioning notch $S_{R-5}$, the neutral positioning notch $S_N$, the first and second speed positioning notch $S_{1-2}$, the second and third speed positioning notch $S_{2-3}$, the third and fourth speed positioning notch $S_{3-4}$, and the fourth and fifth speed deciding notch $S_{4-5}$. After stopping of the rotation of the shift drum 95, the change arm 127 returns to the position due to the spring force of the pinching spring 134 and the drum shifter 106 also returns to the position (see FIGS. 6 and 7).

The rotation angle of the shift drum 95 is detected by a rotation angle detector 135. The rotation angle detector 135 is coupled to the other end of the shift drum 95 and fitted to the second crankcase cover 32. The rotation angle of the change shaft 121 is detected by a change shaft rotation angle detector 136. The change shaft rotation angle detector 136 is coupled to the other end of the change shaft 121 and is fitted to the second crankcase cover 32.

As shown in FIG. 5, a reverse cam groove 141, extending in a circumferential direction of the shift drum 95, is provided at an outer periphery of the shift drum 95 on the opposite side to the second lead groove 97 from the first lead groove 96. A first end 141a and a second end 141b of the reverse cam groove 141 are disposed at positions leaving an intervening gap in a circumferential direction of the shift drum 95.

As shown in FIG. 3, a reverse stopper arm shaft 142 having a shaft parallel to the shift drum 95 is rotatably supported by the case half 23b of the crankcase 23 and the second crankcase cover 32. A base end of the reverse stopper arm 143 with an end fitting into the reverse cam groove 141 is fixed to a case half 23b side end of the reverse stopper arm shaft 142.

The ends of a torsion spring 144, acting as an urging member encompassing the reverse stopper arm shaft 142, engage with the case half 23b and the reverse stopper arm 143. The reverse stopper arm shaft 142 and the reverse stopper arm 143 are then urged to rotate in a direction where the end of the reverse stopper arm 143 fits into the reverse cam groove 141.

A lever 145 is fixed to a projecting end of the reverse stopper arm shaft 142 projecting from the second crankcase cover 32. A reverse select lever (not shown) is coupled to the lever 145 via a wire (not shown). A switch operation arm 146 is fitted with the reverse stopper arm shaft 142 so as to face the inner surface of the second crankcase cover 32.

A reverse detection switch 147 is fitted with the second crankcase cover 32 in such a manner that the switch operation arm 146 is detected when the reverse stopper arm shaft 142 is rotated so that the reverse stopper arm 143 moves towards a side of detachment from the reverse cam groove 141 as a result of operation of the reverse select lever.

Figure 11:
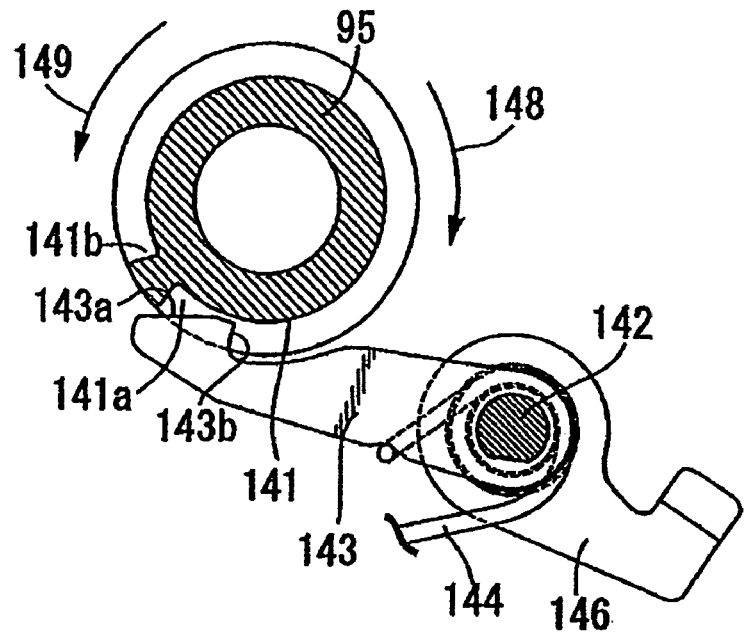
FIG. 11 is a cross-sectional view taken along line 11-11 of FIG. 3 in a state where the shift drum is in a reverse and a fifth gear position.
Figure 12:
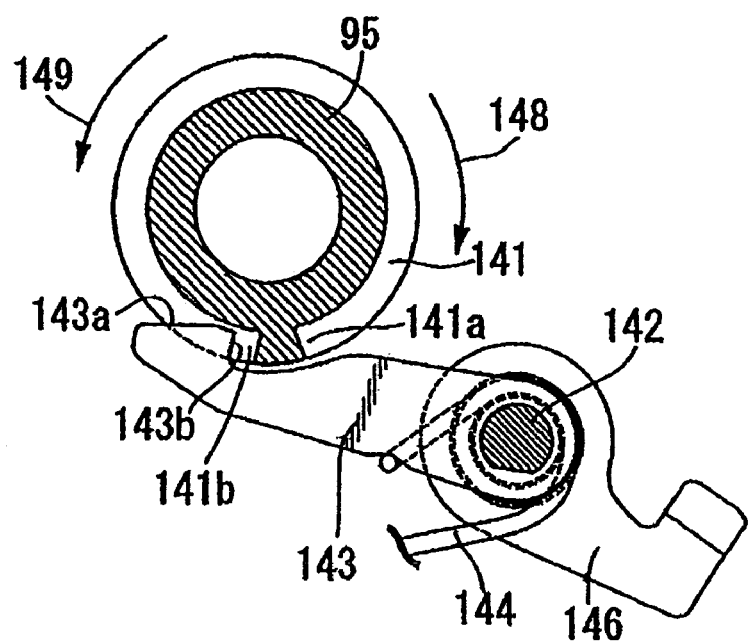
FIG. 12 is a cross-sectional view corresponding to FIG. 11 of the state when the shift drum is in a neutral position.

As shown in FIG. 11, when the shift drum 95 is at reverse and fifth speed position $P_{R-5}$, the end of the reverse stopper arm 143 fits into the first end 141a of the reverse cam groove 141. As shown in FIG. 12, when the shift drum 95 is at the neutral position $P_N$, the end of the reverse stopper arm 143 fits into the second end 141b of the reverse cam groove 141.

When the shift drum 95 rotates in the first rotation direction 148 from the neutral position $P_N$ towards the side of the reverse and fifth speed position $P_{R-5}$, i.e., when the shift drum 95 rotates in a direction for changing speed from neutral to reverse, it is necessary to operate the reverse select lever with the intention of applying an external force, resisting urging force due to the torsion spring 144, to the reverse stopper arm 143.

However, at the time of rotation of the shift drum 95 from a state where the reverse gear GR is engaged, towards the second rotation direction 149, opposite to the first rotation direction 148, it is possible for the reverse stopper arm 143, in a non-operation state of the external force (that is, without applying an external force), to move to the side of the second end 141b of the reverse cam groove 141 from the one end of the reverse cam groove 141 so as to surmount the outer periphery of the shift drum 95.

In other words, the end of the reverse stopper arm 143 is fitted at the first end 141a of the reverse cam groove 141, i.e., the reverse gear GR and the fifth gear train G5 are both capable of becoming engaged, the inclined guide surface 143a is then provided so that the reverse stopper arm 143 can surmount an end wall of the first end 141a of the reverse cam groove 141 so that the reverse stopper arm 143 moves, without requiring any external force, to the second end 141b side of the reverse cam groove 141 at the time of rotation of the shift drum 95 so as to move from a reverse and fifth speed position $P_{R-5}$ in the second direction 149.

The reverse stopper arm includes an engaging surface 143b that comes in contact and engages with the second end 141b side wall of the reverse cam groove 141 in a state where force is not acting on the reverse stopper arm, at the time of rotation of the shift drum 95 from a state where the reverse stopper arm 143 fits with the second end 141b of the reverse cam groove 141, i.e., a state where the shift drum 95 is in the neutral position $P_N$ at the time of rotation of the shift drum 95 to the first rotation direction 148 is also provided.

Figure 13:
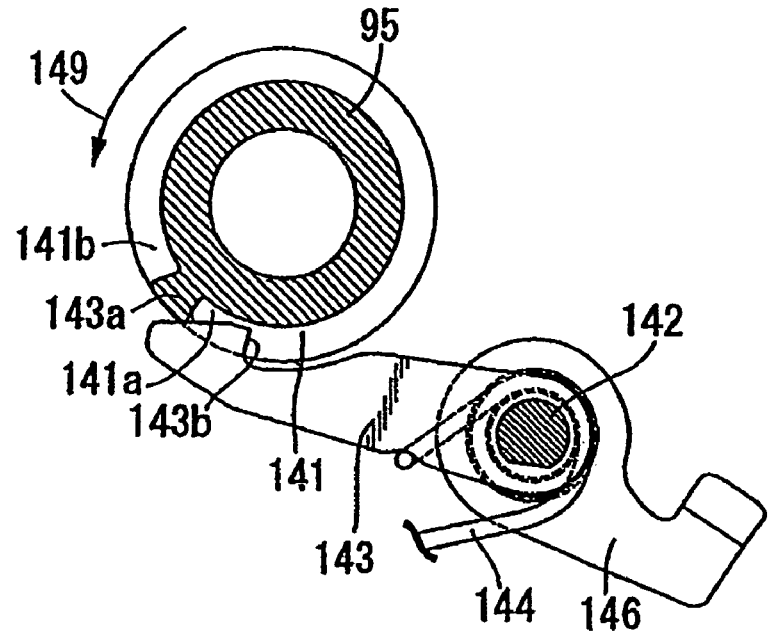
FIG. 13 is a cross-sectional view corresponding to FIG. 11 of the state when the shift drum is rotated slightly from a reverse and fifth speed position in a second rotation direction.
Figure 14:
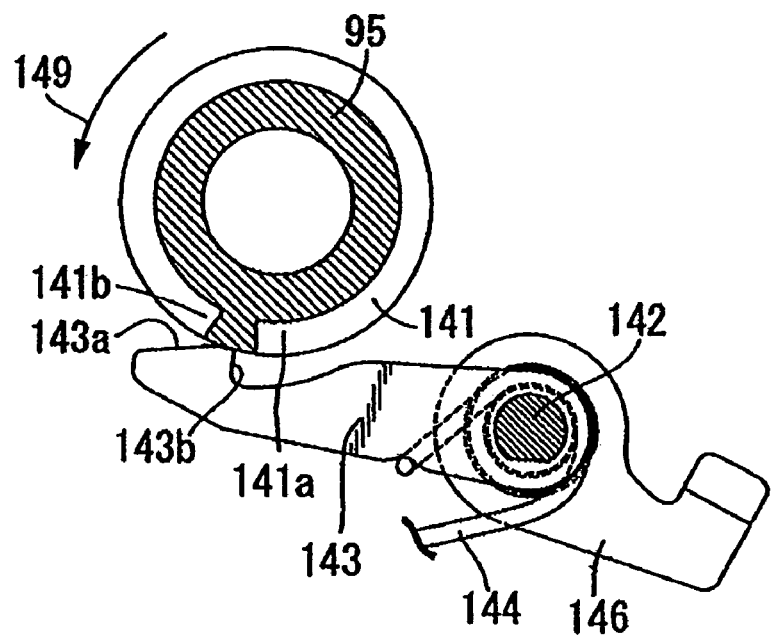
FIG. 14 is a cross-sectional view corresponding to FIG. 11 of the state when the shift drum is further rotated from the state of FIG. 13 in a second rotation direction.

As a result, as shown in FIG. 11, when the shift drum 95 is rotated in the second rotation direction 149 from a state where the end of the reverse stopper arm 143 fits into the first end 141a of the reverse cam groove 141 (as shown in FIG. 13), the inclined guide surface 143a comes in contact with an end wall of first end 141a side of the reverse cam groove 141.

That is, when the shift drum 95 rotates in the second rotation direction 149, as shown in FIG. 11, as a result of being guided by the inclined guide surface 143a, the reverse stopper arm 143 rotates about the axis of the reverse stopper arm shaft 142 so that the end of the reverse stopper arm 143 surmounts the outer periphery of the shift drum 95. As shown in FIG. 12, the end of the reverse stopper arm 143 then fits into the second end 141b of the reverse cam groove 141 as a result of rotation in the second rotation direction 149 of the shift drum 95.

On the other hand, as shown in FIG. 12, when the shift drum 95 is rotated in the first rotation direction 148 in a state where the end of the reverse stopper arm 143 is fitted into the second end 141b of the reverse cam groove 141, the engaging surface 143b of the reverse stopper arm 143 comes into contact with the end wall of the second end 141b side of the reverse cam groove 141 and engages.

An application of an external force resisting the urging force of the torsion spring 144 to the reverse stopper arm 143 is therefore necessary for forcibly detaching the reverse stopper arm from the second end 141b of the reverse cam groove 141. When the shift drum 95 is in the reverse and fifth speed position $P_{R-5}$ so that the fifth gear G5 is engaged, rotation in the first rotation direction 148 of the shift drum 95 is stopped as a result of the shift pin 92a of the second shift fork 92 engaging with a final end 97b1 of the second lead groove 97.

Figure 15:
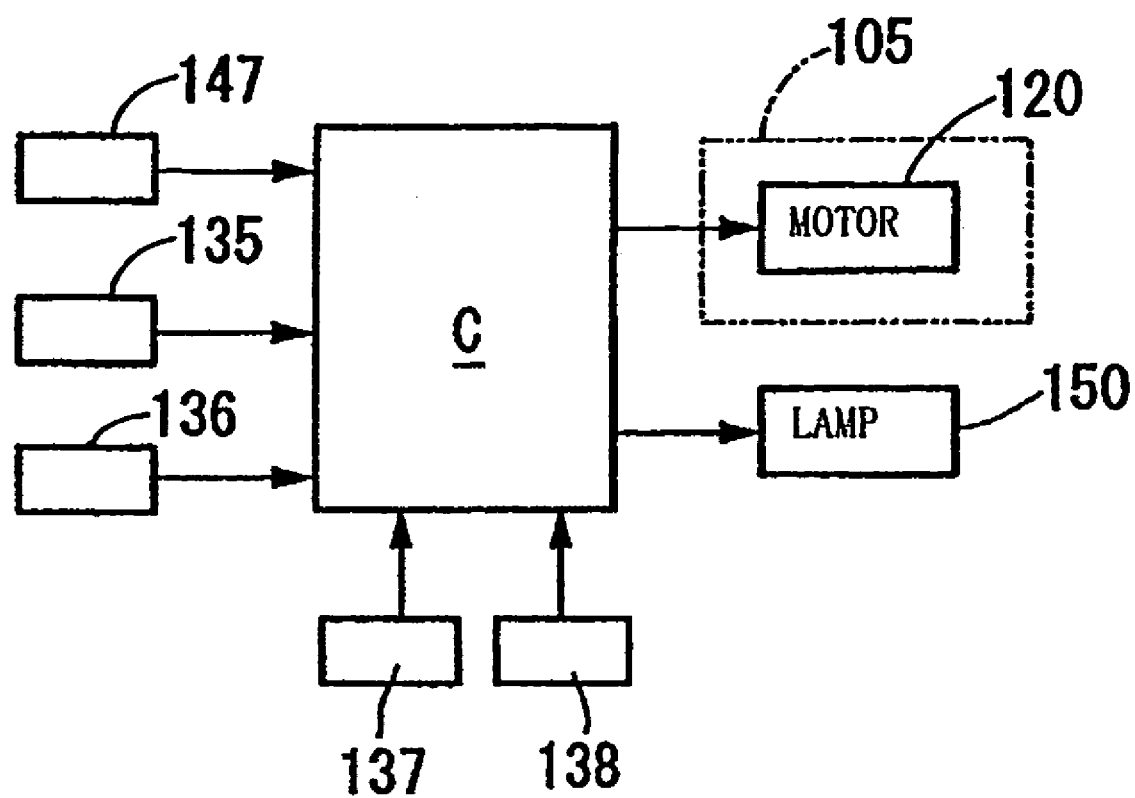
FIG. 15 is a block diagram showing a configuration for a control system.

As shown in FIG. 15, the shift operation motor 120 at the drive unit 105 is controlled by a control unit C based on detection values of the rotation angle detector 135 and the change shaft rotation angle detector 136 together with signals from an engine start-up switch 137 and a brake switch 138. A signal from the reverse detection switch 147 is also inputted to the control unit C. Illumination of a lamp 150 indicating that the reverse gear GR is engaged is also controlled using the control unit C.

Figure 16:
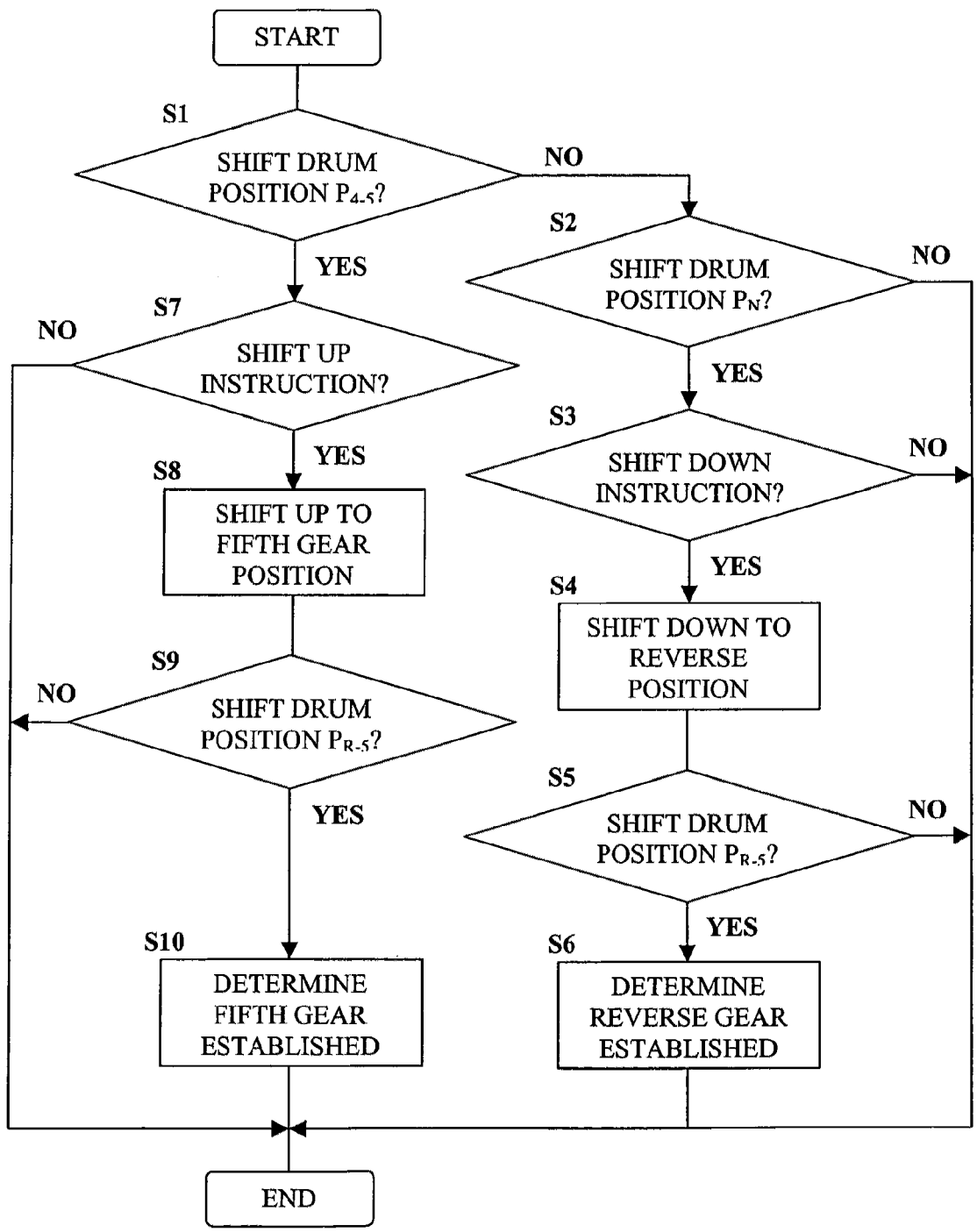
FIG. 16 is a flowchart showing a processing procedure for determining which of two gears is capable of becoming engaged at a common position of the shift drum.

However, the control unit C determines whether or not either of the reverse gear GR and the fifth gear G5 is engaged with the shift drum 95 in a common speed position, that is, the reverse and fifth speed position $P_{R-5}$ during operation of the engine E in accordance with the procedure shown in FIG. 16.

As shown in FIG. 16, in step S1, it is determined whether or not the current rotation angle of the shift drum 95 is in the fourth and fifth speed position $P_{4-5}$. If the current rotation angle is not in the fourth and fifth speed position $P_{4-5}$, it is determined whether or not the rotation angle of the shift drum 95 is in the neutral position $P_N$ in step S2.

When in step S3, it is confirmed that there is a shift down instruction with the rotation angle of the shift drum 95 in the neutral position $P_N$, the shift drum 95 is rotated so as to shift down to the reverse position (step S4). Next, in step S5, when it is determined that the shift drum 95 is in the reverse and fifth speed position $P_{R-5}$, it is determined in step S6 that the reverse gear GR is engaged. A flag indicating that the reverse gear GR is engaged is then erected, and the control unit C illuminates the lamp 150 when the reverse gear GR is engaged.

Further, when it is determined in step S1 that the current rotation angle of the shift drum 95 is at the fourth and fifth speed position $P_{4-5}$, it is confirmed in step S7 that a shift-up instruction has taken place in this state. When a shift-up instruction has taken place, in step S8, the shift drum 95 is rotated so as to shift up to the fifth speed. After this, in step S9, when it is confirmed that the shift drum 95 is in a reverse and fifth speed position $P_{R-5}$, it is determined in step S10 that the fifth gear is engaged. A flag indicating that the fifth gear G5 is engaged is then erected.

In other words, the control unit C determines that the shift drum 95 is at a speed change position neighboring the shift up side at the reverse and fifth speed position $P_{R-5}$ during operation of the engine E, i.e., it is determined that the reverse gear GR is engaged corresponding to the shift drum 95 rotating to the shift down side from the neutral position $P_N$. It is subsequently determined that the fifth gear G5 is engaged according to rotation of the shift drum 95 as the shift drum 95 shifts up from a speed change position neighboring the reverse and fifth speed position $P_{R-5}$ on the shift-up side, i.e., from the fourth and fifth speed positions $P_{4-5}$.

Figure 17:
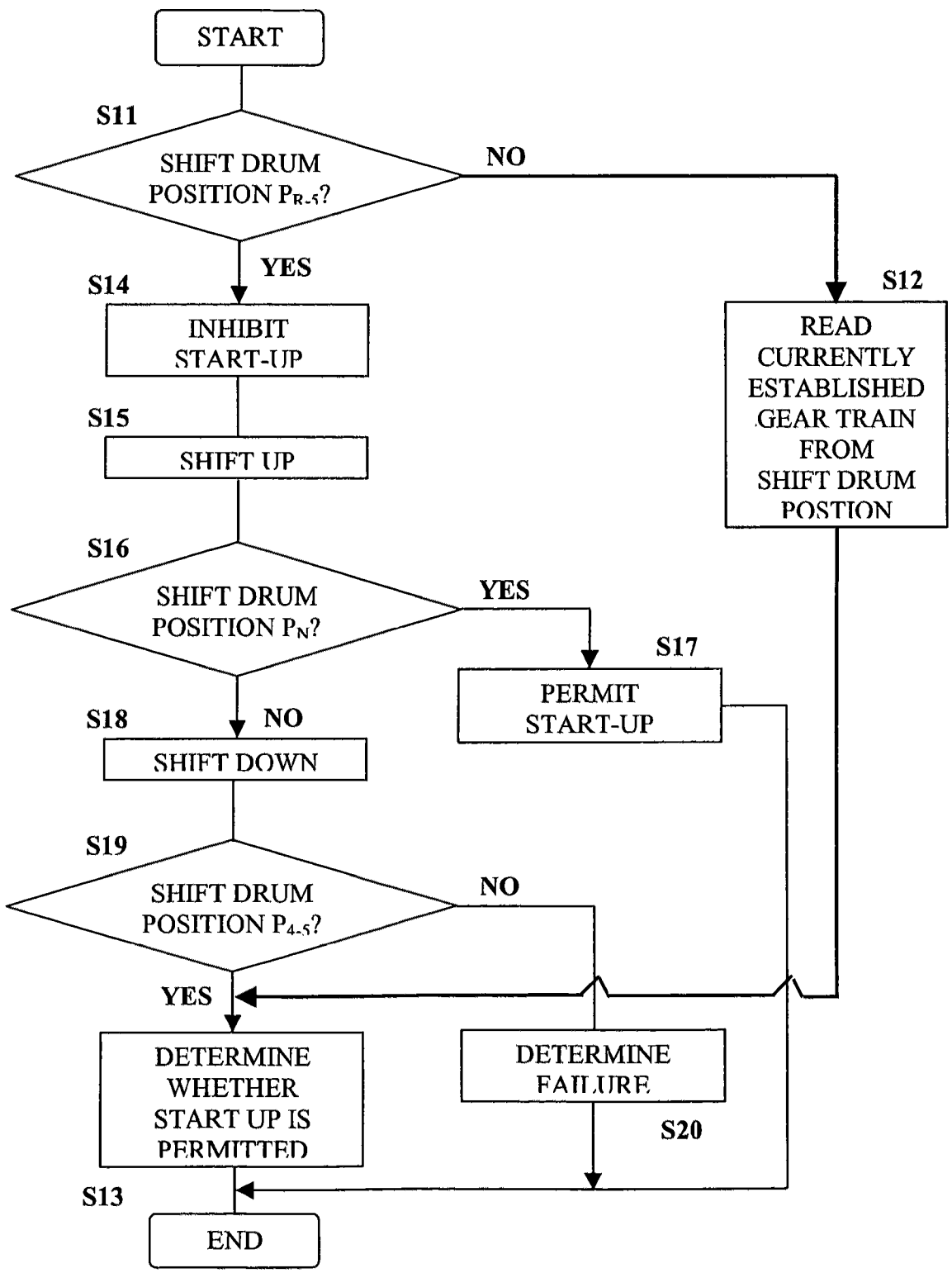
FIG. 17 is a flowchart showing a processing procedure for determining whether or not start-up is possible when starting up the engine.

Further, at the time of ignition/starting up of the engine E, the control unit C determines whether or not starting up is occurring using the procedure shown in FIG. 17. In step S11, it is determined whether or not the current rotation angle of the shift drum 95 is at the reverse and fifth speed position $P_{R-5}$. If not at the reverse and fifth speed position $P_{R-5}$; in step S12, the currently engaged gear is read from the current rotation angle of the shift drum 95.

Then, in step S13, it is determined whether or not starting up is occurring using the currently engaged gear train. This start up determination indicates that it is possible to start up the engine E when a signal indicating that a brake operation has taken place is inputted by the brake switch 138, for example, any of the gear trains engaged.

When it is confirmed in step S11 that the current rotation angle of the shift drum 95 is the reverse and fifth speed position $P_{R-5}$, in step S14 starting up of the engine E is inhibited. In the next step S15, an instruction to rotate the shift drum 95 to the shift up side by one gear only is outputted. In step S16, when it is confirmed that the rotation angle of the shift drum 95 is at the neutral position PN, starting up of the engine is permitted in step S17.

When it is confirmed in step S16 that the current rotation angle of the shift drum 95 is at the reverse and fifth speed position $P_{R-5}$, in step S18 an instruction to rotate the shift drum 95 by one gear to the shift down side is outputted. When it is confirmed in step S19 that the shift drum 95 is in the fourth and fifth speed position $P_{4-5}$, step S13 is proceeded to and it is determined whether or not starting-up is possible. When the fourth and fifth speed position $P_{4-5}$ cannot be confirmed in step S19, step S20 is selected and failure is determined.

In other words, in order to determine whether or not starting up of the engine is possible, the control unit C executes several steps: a first step of inhibiting starting up of the engine E with the shift drum 95 in the common speed change position; a second step of operating the drive unit 105 so as to rotate the shift drum 95 for shifting up just one gear; a third step of determining whether or not the shift drum 95 has been rotated to the neutral position $P_N$ neighboring the shift-up side at the common speed change position by the shifting up process of the second step; a fourth step that permits starting up of the engine E when it is determined in the third step that the rotation to the neutral position $P_N$ has taken place as a result of shift-up processing of the second step; a fifth step of actuating the drive unit 105 so that the shift drum 95 is rotated to the shift down according to the determination in the third step that determines that the neutral position $P_N$ has been rotated to in the processing of the second step; a sixth step of determining whether or not the shift drum 95 is rotated to a speed change position (fourth and fifth speed positions $P_{4-5}$) neighboring the common speed change position on the shift down in the shift-down processing of the fifth step; a seventh step of determining that gear trains corresponding to the speed change position neighboring the common speed change position on the shift down side, i.e., the fourth and fifth gears G4 and G5 of the plurality of gears G1, G2, G3, G4 and G5 are established in accordance with confirmation that the shift drum 95 rotated to the speed change position neighboring the common gear change position on the shift-down side in the sixth step; and an eighth step of determining failure when it is confirmed in the sixth step that the shift drum 95 has not rotated to the fourth and fifth speed positions P4-5.

When it is determined that an engine start-up signal is inputted from the engine start-up switch 137 after the start-up possible/not possible determination processing, as explained above, the control unit C starts the engine E with the shift drum 95 in the neutral position $P_N$. The engine E is then started up only while a brake operation signal is inputted by the brake switch 138 with at least one of the reverse gear GR and the plurality of gears G1, G2, G3, G4, G5 engaged.

Figure 18:
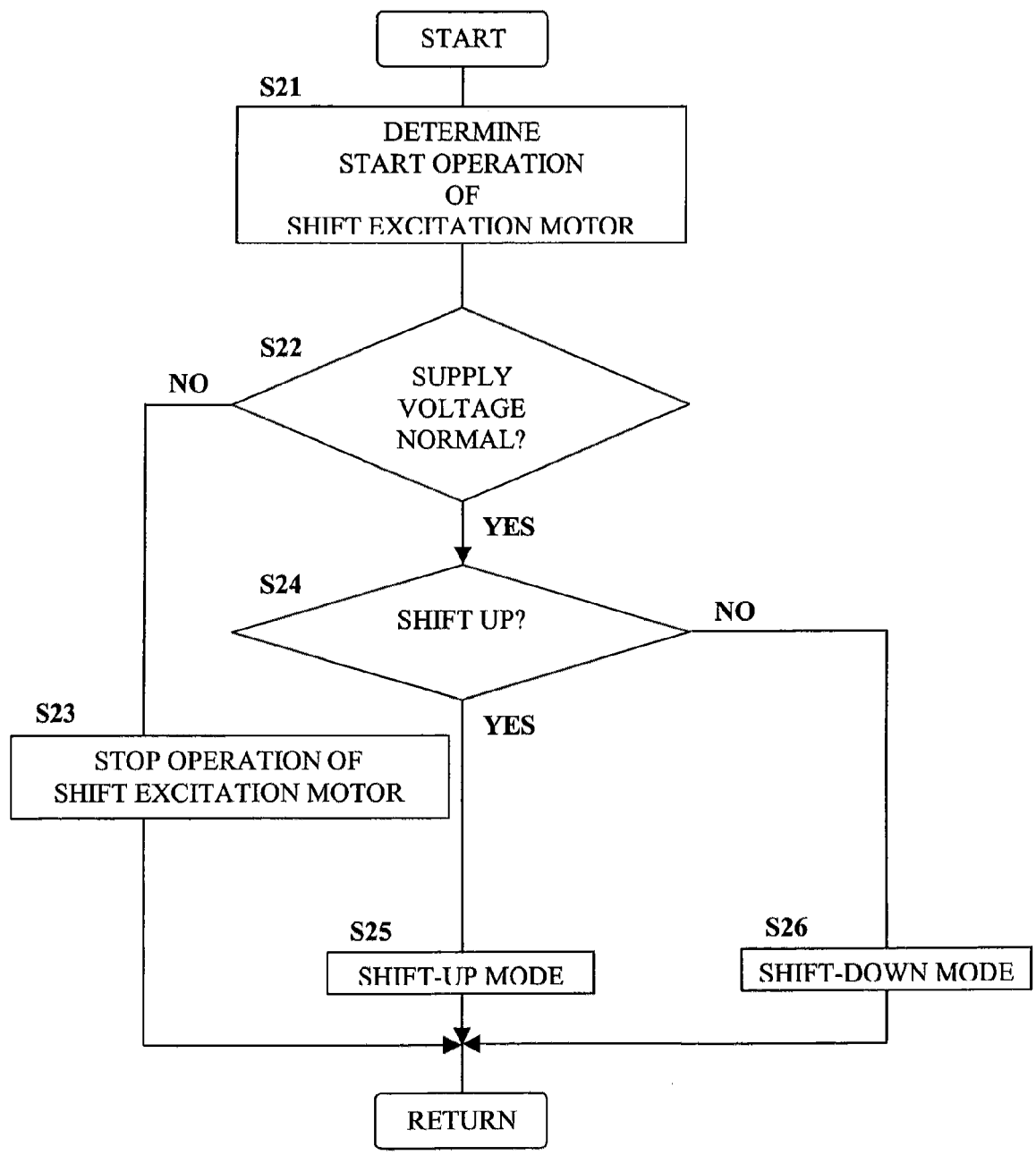
FIG. 18 is a flowchart showing a control procedure for a shift operation motor.

The operation of the shift operation motor 120 is executed in accordance with the procedure shown in FIG. 18. In step S21, it is determined whether or not operation of the shift operation motor 120 has started. The rotation angle of the change shaft 121 is initially corrected to "0". Next, in step S22, it is determined whether or not an output voltage of a battery exceeds a predetermined value to give a normal state. When it is determined that the supply voltage is insufficient, step S23 is proceeded to halt operation of the shift operation motor.

When it is determined that the supply voltage is normal in step 22, a further step S24 is followed in which it is determined whether or not shifting up has taken place. When shifting up has taken place, the step S25 for processing of shift up mode is executed. When shifting up has not taken place is determine in step 24, the processing of shift down mode is executed in step S26.

Figure 19:
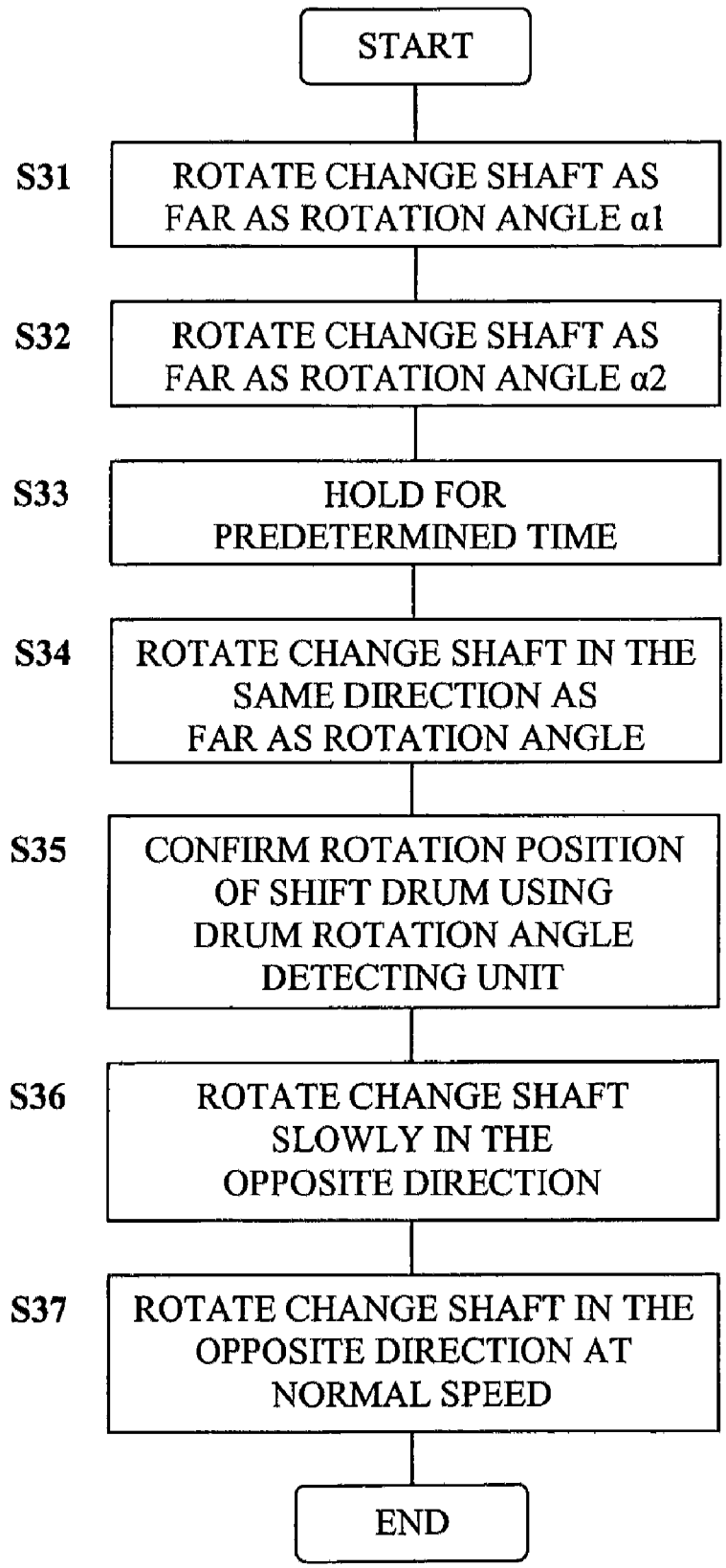
FIG. 19 is a flowchart showing a control procedure for a shift-up mode.
Figure 20:
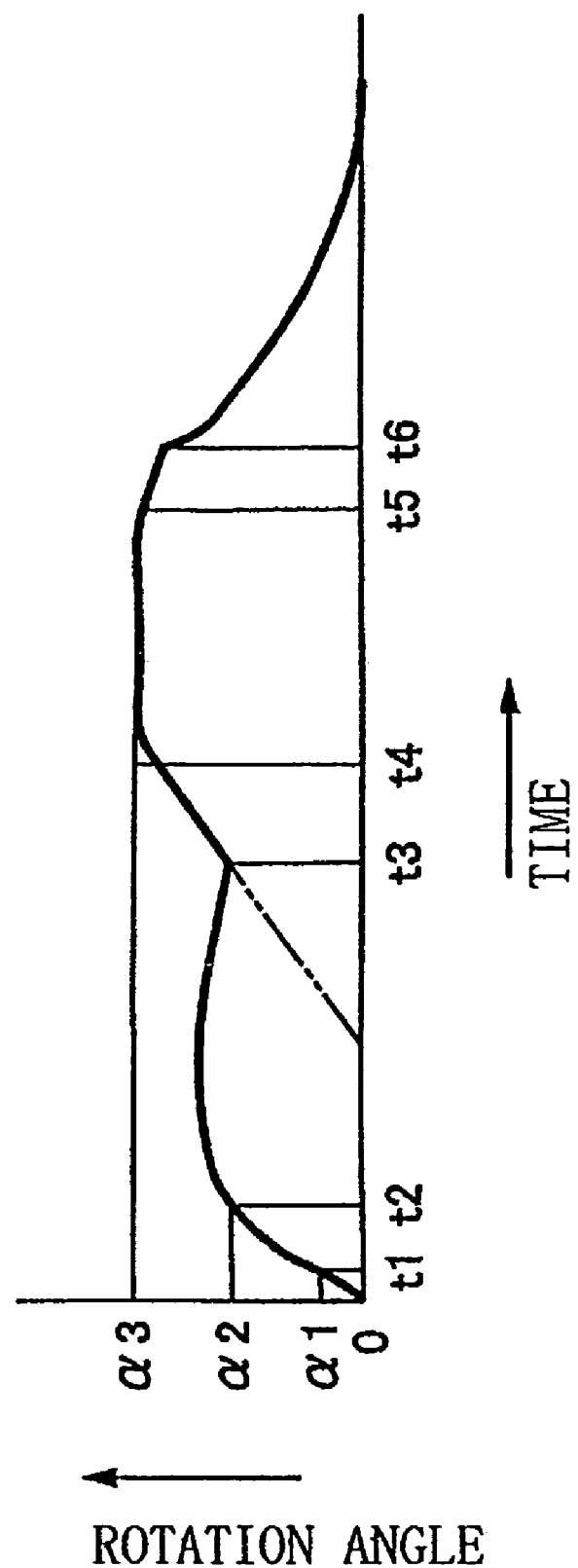
FIG. 20 is a view showing a rotation angle of a change shaft during shifting up.

The operation procedure shown in FIG. 19 is executed in shift-up mode. The rotation angle of the change shaft 121 is changed as shown in FIG. 20 as a result of the shift-up mode processing. Namely, in step S31, the shift operation motor 120 is operated so as to rotate the change shaft 121 in such a manner that the rotation angle of the change shaft 121 detected by the change shaft rotation angle detector 136 becomes α1. The processing of step S31 confirms the rotation direction of the change shaft 121 and the required time. When it is confirmed in step 31 that the rotation angle α1 is reached at a time t1, step S32 is followed, in which, the shift operation motor 120 is operated so as to rotate the change shaft 121 so that the rotation angle of the change shaft 121 detected by the change shaft rotation angle detector 136 becomes α2.

This rotation angle α2 is set to substantially half of the rotation angle (in this embodiment, sixty degrees) required to sequentially rotate the shift drum 95 to each of the positions of the reverse and fifth speed position $P_{R-5}$, the neutral position $P_N$, the first and second speed positions $P_{1-2}$, the second and third speed positions $P_{2-3}$, the third and fourth speed positions $P_{3-4}$, and the fourth and fifth speed positions $P_{4-5}$. In this embodiment, this angle α2 is about thirty degrees. The gear engaged up to this time, as a result of the operation of the shifter resulting from rotation of the change shaft 121 up to the rotation angle α2, is then no longer engaged, i.e. the transmission is put into neutral.

Step S33 is followed when the rotation angle of the change shaft 121 reaches α2. The operation of the shift operation motor 120 is temporarily halted and this halted state is held for a predetermined time ΔT, e.g., until a time t3.

At time t3, in step S34, the shift operation motor 120 is rotated in the same direction so as to rotate the change shaft 121 in the same direction for obtaining the rotation of rotation angles α1 and α2 until a rotation angle α3 is reached. The rotation angle α3 is a rotation required to sequentially rotate the shift drum 95 to each of the positions of the reverse and fifth speed position $P_{R-5}$, the neutral position $P_N$, the first and second speed positions $P_{1-2}$, the second and third speed positions $P_{2-3}$, the third and fourth speed positions $P_{3-4}$, and the fourth and fifth speed positions $P_{4-5}$.

In this embodiment, the rotation angle α3 is sixty degrees. The intended gear, i.e., one of the gears G1, G2, G3, G4, G5, and GR is then engaged as a result of rotation up to the rotation angle α3 of the change shaft 121. During this time, rotation of the drum shifter 106 is restricted as a result of the end of one of the pawls 107 coming into contact with the restricting projection 117b.

After the change shaft 121 is rotated as far as the rotation angle α3 at a time t4, in step S35, it is confirmed whether or not the shift drum 95 is at a predetermined rotation position by the rotation angle detector 135. At time t5, the change shaft 121 is rotated slowly in the opposite direction based on step S36. This processing is for preventing selective engagement of the drum stopper arm 100 with the notches $S_{2-3}$, $S_{3-4}$, $S_{3-5}$ of the shift drum center 99 from becoming released. At a time t6, in step S37, the shift operation motor 120 is operated to rotate the change shaft 121 at normal speed in the reverse direction to return to "zero" degrees.

As shown by the dotted and dashed line in FIG. 20, the rotation angle of the change shaft 121 changes linearly at the time of shifting up and shifting down during starting up.

A description is provided for a case of driving in second gear, i.e., a state where the drum stopper arm 100 engages with the first and second speed positioning notch $S_{1-2}$ of the shift drum center 99. The second hydraulic clutch 53 is engaged. Every time the third speed is shifted up to while the first hydraulic clutch 52 disengaged, the drum stopper arm 100 engages with the second and third speed positioning notch $S_{2-3}$ of the shift drum center 99 as a result of a preliminary gear shift.

Here, the change shaft 121 and the change arm 127 rotate in a clockwise direction, as shown in FIG. 6, in response to operation of the shift operation motor 120. The drum shifter 106 of the drive unit 105 is then displaced by the change shaft 121 so as to rotate in a clockwise direction of FIG. 6 with the engaging pin 129 within the engaging hole 128 as a result of the engaging pin 129 engaging with the engaging hole 128 of the change arm 127.

One of the pawls 107, 107 is engaged with the two engaging recesses 109, 109 such that a portion corresponding to the large diameter circular arc section 117a of the guide hole 117 of the guide plate 110 rotates about an axis of the shaft 111a so that the shift drum center 99 rotates in a clockwise direction (see FIG. 6).

When the shift drum center 99, i.e., the shift drum 95 rotates approximately thirty degrees, as shown in FIG. 9, the roller 102 of the drum stopper arm 100 surmounts a raised section between the first and second speed positioning notch $S_{1-2}$ and the neutral notch $N_1$ so as to engage with the neutral notch N1. In this state, the operation of the shift operation motor 120 is temporarily halted and this halted state is maintained for a predetermined time ΔT.

After the predetermined time ΔT elapses, operation of the shift operation motor 120 is resumed. The drum shifter 106 then rotates up to a point where the roller 102 of the drum stopper arm 100 engages with the second and third speed positioning notch S2-3. Shifting up to the third speed is completed by engaging the first hydraulic clutch 52. When operation of the shift operation motor 120 stops, the change arm 127 returns to the position shown in FIGS. 6 and 7 as a result of spring force of the pinching spring 134. The drum shifter 106 also returns to a position as shown in FIGS. 6 and 7.

In other words, the drive unit 105 having the shift operation motor 120 rotates the shift drum center 99 in such a manner that the drum stopper arm 100 moves from a state of engagement with the first and second speed positioning notch $S_{1-2}$ to a state of engagement with the second and third speed positioning notch $S_{2-3}$. Every time this happens, the drum stopper arm 100 is temporarily maintained in a state of engagement with the neutral notch $N_1$ as a result of temporarily stopping midway through rotation, and the first shifter 72 is temporarily maintained in a neutral state.

In this way, the drive unit 105 temporarily stops the rotation of the shift drum 95 while the drum stopper arm 100 engages with the second and third speed positioning notch $S_{2-3}$ of shift drum center 99 as a result of the preliminary gear shift, that is, a shift up from the first speed to the third speed when traveling in second gear. The action of the drive unit 105 is the similar at the time of a preliminary gear shift from third to fifth speed, and from second to fourth speed.

At the time of the preliminary gear shifting, that is, a shift down from fourth to second speed, a shift down from fifth to third speed, and a shift down from third to first speed, the shift down mode of step S26 in FIG. 18 is executed. In this shift down mode, the shift up mode carries out the similar processing, in reverse order, as at the time of shifting up with the rotation direction of the shift operation motor 120.

The first and third shift forks 91, 93 are guided by neutral sections 96e, 98e, extending in a circumferential direction of the shift drum 95 formed at a central portion of the coupling sections 96c, 98c of the first and third lead grooves 96, 98 provided at an outer periphery of the shift drum 95. While the first and third shifters 72, 74 that rotate together with the first main shaft 44 and the counter shaft 46 are released from engagement with one of the first speed drive idler gear 57, the third speed drive idler gear 59 on either side of the first and third shifters 72, 74 and the second speed driven idler gear 64 and the fourth speed driven idler gear 66, and slide to a side of engagement with another idler gear.

Therefore, compared with an arrangement where the coupling section is in the shape of a straight line, it is possible to delay the timing of engagement of the first and third shifters 72, 74 to other portions of the first speed drive idler gear 57, the third speed drive idler gear 59, the second speed driven idler gear 64, and the fourth speed driven idler gear 66 with respect to rotation of the shift drum 95.

However, while the first, second and third shifters 72, 73, 74 are slid with the intention of switching over for establishing each of the forward gears G1, G2, G3, G4, G5 and reverse gear GR, the drive unit 105 rotates the shift drum center 99 by a predetermined angle. The drive unit 105 is constructed in order to make rotation of the shift drum center 99 in a state where the shifters 72, 73, 74 are in the middle of sliding so as to be in a neutral state, in a lowest speed or temporarily stopped.

Further, when a gear is in the middle of establishment, rotation of the shift drum 95, i.e., the sliding operation of the first, second and third shifters 72, 73, 74 is temporarily stopped, and the first, second and third shifters enter a neutral position. Moreover, the drum stopper arm 100 selectively engages with the outer periphery of the shift drum center 99 and one of a number of positioning notches $S_{1-2}$, $S_{2-3}$, $S_{3-4}$, $S_{4-5}$ for establishing one of forward gears G1, G2, G3, G4, G5, which are equally spaced from each other.

The neutral notches $N_1$, $N_2$, $N_3$ are disposed at a central portion between each of the positioning notches S1-2, $S_{2-3}$, $S_{3-4}$, $S_{4-5}$ so as to enable engagement with the drum stopper arm 100. The rotational speed of the shift drum 95, i.e., the sliding speed of the first, second and third shifters 72, 73, 74 can therefore be temporarily slowed down as a result of rotational resistance acting on the drum shifter 106 from the drum stopper arm 100 during establishment of a gear.

Difference in speed between the first and third shifters 72, 74 that are interdependent with the motion of the neutral sections 96e, 98e formed at the central portion of the coupling sections 96c, 98c in the possession of the lead grooves 96, 98 and the gears that the shifters 72, 74 engage with is comparatively small. Noise resulting from engagement can therefore be prevented in a more effective manner.

The first shifter 72 that rotates with the first main shaft 44 interrupts the transmission of power from the engine E to the first main shaft 44. The first shift fork 91 is guided by a neutral section 96e extending in a circumferential direction of the shift drum 95 formed at a central section of the coupling section 96c of the first lead groove 96 provided at the outer periphery of the shift drum 95 while engagement of one of the first speed drive idler gear 57 and the third speed drive idler gear 59 on either side of the first shifter 72 is released, and the other is engaged with power being transmitted from the engine E to the second main shaft 45.

Accordingly, it is possible to delay the timing of engagement of the first shifter 72 to the idler gears 57, 59 with respect to the rotation of the shift drum 95. Rotation of the shift drum 95 is stopped midway by stopping the send operation of a predetermined angle by the drive unit 105 midway and having on of the pawls 107, 107 engage with the engaging recess 109 as a result of the guide plate 110.

In addition, rotation of the shift drum center 99 is stopped temporarily midway through rotation as a result of engagement of the drum stopper arm 100 with the neutral notch $N_1$ of the outer periphery of the shift drum center 99.

It is, therefore, possible to make the difference between the rotational speed of the first shifter 72 accompanying the rotation of the first main shaft 44 due to the viscosity of the lubricating oil filled between the needle bearings 48 provided between the first and second main shafts 44, 45 and the viscosity of the lubricating oil filled between the first hydraulic clutch 52 and the cylindrical transmission shaft 49 and the relative rotational speed of the idler gears 57, 59 comparatively small with the idler gears 57, 59 in a state of rotation as a result of the establishment of the second gear G2 provided between the second main shaft 45 and the counter shaft 46. Accordingly, it is possible to prevent engagement noise from becoming loud.

The third shifter 74 that rotates together with the counter shaft 46 interrupts the transmission of power from the engine E to the second main shaft 45. The third shift fork 93 is guided by a neutral section 98e extending in a circumferential direction of the shift drum 95 formed at a central portion of the coupling section 98c of the third lead groove 98 provided at the outer periphery of the shift drum 95 while the engagement of one of the second speed driven idler gear 64 and the fourth speed driven idler gear 66 that are on either side of the third shifter 74 is released and sliding takes place to the side of engagement with the other in a state where the engine E is transmitting force to the first main shaft 44.

Hence, it is possible to delay the timing of engagement of the third shifter 74 to the idler gears 64, 66 with respect to rotation of the shift drum 95.

Rotation of the shift drum center 99 can be temporarily stopped midway through rotation as a result of stopping of the sending operation of a predetermined angle by the drive unit 105, resistance to rotation due to the guide plate 110, and engagement of the drum stopper arm 100 with the neutral notch N2 of the outer periphery of the shift drum center 99.

It is therefore possible, in a situation where the counter shaft 46 and the third shifter 74 are rotating due to establishment of the third gear G3 provided between the first main shaft 44 and the counter shaft 46, to make the difference between the rotation speed of the idler gears 64, 66 accompanying the turning of the second main shaft 45 due to the viscosity of the lubricating oil filled between the needle bearings 48 provided between the first and second main shafts 44, 45 and the viscosity of the lubricating oil filled between the second hydraulic clutch 53 and the cylindrical transmission shaft 49 and the relative rotational velocity of the third shifter 74 can be made comparatively small. It is therefore possible to effectively prevent noise resulting from engagement from becoming substantially loud.

At least the second lead groove 97 that is one specific lead groove of the lead grooves 96 to 98 provided at the outer periphery of the shift drum 95 continues in excess of one time around the shift drum 95 so as to be disposed at the outer periphery of the shift drum 95 in such a manner that both ends are disposed offset from each other in a direction along an axis of the shift drum 95.

The reverse and fifth speed position $P_{R-5}$ that is a common position for establishing two different gears, in this embodiment the gears GR, G5 for the reverse gear and the fifth gear is set at a single location corresponding to the ends of the second lead groove 97 along a circumferential direction of the shift drum 95.

Accordingly, it is possible to avoid a situation where the transmission becomes larger as a result of the shift drum 95 having a large diameter. Also, substantial changes to the shapes of the lead grooves 96 to 98 are no longer necessary, and increases in the number of design steps can be avoided. Accordingly, it is possible to increase the number of speed change positions set at the shift drum 95.

The second lead groove 97 is formed so as to set out of alignment gradually on one side along the axis of the shift drum 95 in a direction from one end to the other end. The ends of the second lead groove 97 are disposed so as to be out of alignment with each other along the axis of the shift drum 95. An increase in dimension in an axial direction of the shift drum 95 can therefore be prevented without influencing the action of the shift fork 92.

Further, at the time of operation of the engine E, the control unit C—that controls the operation of the drive unit 105 according to rotation angle detection of the rotation angle detector 135 that detects the rotation angle of the shift drum 95—determines that the reverse gear GR is engaged according to rotation of the shift drum 95 from the speed change position (neutral position $P_N$) neighboring the reverse and fifth speed positions $P_{R-5}$ neighboring on the shift-up side to the shift down side.

The control unit C also determines that the fifth gear G5 is engaged according to rotation of the shift drum 95 from a speed change position (fourth and fifth speed positions $P_{4-5}$) neighboring the reverse and fifth speed position $P_{R-5}$ on the shift-down side to a shift-up side.

In other words, even if the reverse gear GR and the fifth speed (fastest speed) gear G5 are established at the same position in a circumferential direction of the shift drum 95, it is possible to reliably determine the state of either of a gear speed and the maximum gear speed using the single rotation angle detector 135.

The control unit C determines whether or not the engine is starting up when it is determined that the shift drum 95 is in the common speed position based on the detection results of the rotation angle detector 135 at the time of starting the engine E. Hence, it is possible to confirm the speed change position in a reliable manner even in the case of the common speed change position.

Further, in order to determine whether or not the engine E is starting up, the control unit C executes several steps including: a first step that inhibits starting up of the engine E with the shift drum 95 in the common speed change position; a second step of operating the drive unit 105 so as to rotate the shift drum 95 to the side of shifting up just one gear; a third step of determining whether or not the shift drum 95 has been rotated to the neutral position PN neighboring the shift-up side at the common speed change position by the shifting up process of the second step; a fourth step that permits starting up of the engine E when it is determined in the third step that the rotation to the neutral position $P_N$ has taken place as a result of shift-up processing of the second step; a fifth step of actuating the drive unit 105 so that the shift drum 95 is rotated to the shift down side according to the determination in the third step that determines that the neutral position $P_N$ has been rotated to in the third step; a sixth step of determining whether or not the shift drum 95 is rotated so as to be shifted down to a speed change position (fourth and fifth speed positions P4-5) neighboring the common speed change position on the shift down side in the shift-down processing of the fifth step; a seventh step of determining that gear trains corresponding to the speed change position neighboring the common speed change position on the shift down side, i.e. the fourth and fifth gears G4 and G5 of the gears G1 to G5 and GR for the number of gears are established in accordance with confirmation that the shift drum 95 rotates to the speed change position neighboring the common gear change position on the shift-down side in the sixth step; and an eighth step of determining failure when it is confirmed in the sixth step that the shift drum 95 has not rotated to the fourth and fifth speed positions P4-5.

According to the determination of whether or not starting up of the engine E is possible, during start-up of the engine E, start-up is permitted only when the shift drum 95 is at the neutral position PN. In other words, the neutral position $P_N$ is not moved to even as a result of a shifting up process from a state where the reverse gear GR is engaged.

Further, it is also possible to carry out abnormality occurring failure processing when a gear speed that is one speed down from the maximum gear speed, i.e., a fourth speed is not engaged as a result of shift-down processing from a state where the fifth gear G5 is engaged.

When an engine start-up signal is inputted after determining whether or not starting up of the engine E is possible, the control unit C starts up the engine E with the shift drum 95 in the neutral position $P_N$. It is possible to start-up the engine E only when a brake operation signal is being inputted while at least one of the gears G1, G2, G3, G4, G5, GR is engaged. It is therefore possible to exert control so at to not go forwards or in reverse even if an operation for starting up the engine E is carried out after stopping the engine E with the reverse gear GR or a forward gear engaged.

The reverse cam groove 141 is formed on the outer periphery of the shift drum 95 so as to extend in a circumferential direction of the shift drum 95, in such a manner that the first and second ends 141a, 141b are arranged at positions spaced in the circumferential direction of the shift drum 95. The reverse stopper arm 143 that fits into the reverse cam groove 141 is urged into the reverse cam groove 141 by the torsion spring 144 (also referred as an urging member 144).

However, at the common speed change position, i.e., the reverse and fifth speed position $P_{R-5}$, for establishing either the fifth gear G5 or the reverse gear GR, the reverse stopper arm 143 fits with first end 141a of the reverse cam groove 141 so that the reverse and fifth speed position $P_{R-5}$ is set at the shift drum 95.

Regarding the necessity of applying external force, resisting the urging force due to the torsion spring 144 to the reverse stopper arm 143 while the shift drum 95 rotates in the first rotation direction 148 so as to establish the reverse gear GR, when the shift drum 95 rotates in the second rotation direction 149, opposite to the first rotation direction, from the state where the reverse gear GR is engaged, the reverse stopper arm 143 does not require an external force for surmounting (crossing over) the outer periphery of the shift drum 95 from the first end 141a of the reverse cam groove 141 so as to become detached, and movement to the second end 141b of the reverse cam groove 141 is possible.

When the shift drum 95 is rotated from a state where the reverse stopper arm 143 is fitted into first end 141a of the reverse cam groove 141, an operation to ensure that external force acting in a direction of resistance to urging force of the torsion spring 144 acts on the reverse stopper arm 143 is not necessary, and therefore, lowering of operativity can be avoided.

Further, the inclined guide surface 143a is formed at an end portion of the reverse stopper arm 143. The inclined guide surface 143a enables the reverse stopper arm 143 to surmount an end wall of an end side of the reverse cam groove 141 and move to the second end 141b of the reverse cam groove 141 when the shift drum 95 rotates, from a state where the reverse gear GR is engaged, in the second rotation direction 149, and the engaging surface 143b that comes in contact with and engages with an end wall of the side of the other end of the reverse cam groove 141 without requiring an external force acting thereon.

It is therefore possible with a simple structure, e.g., the inclined guide surface 143a and the engaging surface 143b, to enable engagement of the reverse stopper arm 143 with the other end wall of the reverse cam groove 141 and to enable surmounting of the reverse stopper arm 143 from the first end 141a of the reverse cam groove 141 to the second end 141b.

When the shift drum 95 is in the neutral position $P_N$, that is, when none of the gears G1, G2, G3, G4, G5, GR is engaged, the reverse stopper arm 143 fits with the second end 141b of the reverse cam groove 141. The vehicle therefore does not travel even if the shift drum 95 is rotated in the second rotation direction 149 from a state where the reverse gear GR is engaged with an external force not acting on the reverse stopper arm 143.

The above is a description of selected illustrative embodiments of the present invention, but the present invention is not limited to the above-described embodiments, and various design modifications are possible without deviating from the present invention as laid out in the patent claims.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A transmission assembly comprising:
a shift drum operable to rotate in a first rotation direction and a second rotation direction so as to engage a selected one of a reverse gear and a plurality of forward gears, said plurality of forward gears comprising a fastest forward gear;
the shift drum having a reverse cam groove formed on an outer periphery thereof, and extending in a circumferential direction thereon; said reverse cam groove having a first end and a second end situated at positions spaced apart in a circumferential direction of the shift drum; and
a reverse stopper arm urged by an urging member into the reverse cam groove, wherein the shift drum is configured such that at a common speed change position, in which either the fastest forward gear or the reverse gear is capable of becoming engaged, the reverse stopper arm fits into the first end of the reverse cam groove,
said reverse stopper arm being operable in a manner such that:
when the reverse gear is not engaged, the reverse stopper arm must be detached from the first end of the reverse cam groove, as a result of a force applied to the reverse stopper arm while the shift drum is rotated in said first rotation direction in order to engage the reverse gear;
and when the reverse gear is engaged, the shift drum rotates in the second rotation direction, which is opposite to the first rotation direction, and the reverse stopper arm is in a state in which external force does not act thereon, and is operable to surmount an outer periphery of the shift drum, to move out of the first end of the reverse cam groove, and to move towards the second end of the reverse cam groove.

2. A transmission assembly according to claim 1, wherein said reverse stopper arm further comprises:

an inclined guide surface formed on a portion the reverse stopper arm, said inclined guide surface enabling the reverse stopper arm to surmount an end wall of the first end of the reverse cam groove and to move to the second end of the reverse cam groove when the shift drum rotates in the second rotation direction from the state where the reverse gear is engaged; and an engaging surface that comes in contact with and engages with an end wall of the second end of the reverse cam groove with the external force not acting during rotation of the shift drum in the first rotation direction from a state in which the reverse stopper arm fits with the first end of the reverse cam groove.

3. A transmission assembly according to claim 1, wherein the reverse stopper arm is engaged with the second end of the reverse cam groove when the shift drum is in a neutral position where none of the reverse or forward gears are engaged.

4. A transmission assembly according to claim 2, wherein the reverse stopper arm is engaged with the second end of the reverse cam groove when the shift drum is in a neutral position, where none of the reverse or forward gears are engaged.

5. A transmission assembly according to claim 2, wherein said inclined guide surface is formed at an end portion of the reverse stopper arm.

6. A transmission assembly comprising:
  a shift drum operable to rotate in a first direction and a second direction opposite to said first direction so as to engage a selected one of a reverse gear, a plurality of forward gears, and a neutral gear, said plurality of forward gears comprising a fastest forward gear;
  the shift drum having a reverse cam groove formed on an outer periphery thereof, and extending in a circumferential direction of the shift drum; said reverse cam groove having a first end and a second end situated at positions spaced in the circumferential direction of the shift drum;
  the shift drum further having a lead groove provided at the outer periphery thereof configured so as to continue in excess of one circumference of the shift drum with both ends offset in a direction along an axis of the shift drum; and
  a reverse stopper arm urged by a torsion spring into the reverse cam groove;
  wherein, in order to change a gear position from the reverse gear position to a neutral position, when the reverse gear is engaged by the shift drum, the shift drum is rotated in said second direction, and during rotation of the shift drum, the reverse stopper arm detaches from engagement with the first end of the reverse cam groove and surmounts a portion of an outer periphery of the shift drum without requiring any application of external force, opposite to a force applied by the torsion spring, to the reverse stopper arm, and
  wherein the shift drum is set in such a manner that at a common speed change position, in which either the fastest forward gear or the reverse gear is capable of becoming engaged, the reverse stopper arm fits into said first end of the reverse cam groove.

7. A transmission assembly according to claim 6, wherein when the reverse gear is not engaged, the reverse stopper arm must be detached from the first end of the reverse cam groove by applying an external force, opposing the force of the torsion spring, to the reverse stopper arm while the shift drum is rotated in said first direction in order to engage the reverse gear.

8. A transmission assembly according to claim 6, wherein said reverse stopper arm comprises an inclined guide surface formed on a portion the reverse stopper arm, said inclined guide surface enabling the reverse stopper arm to surmount an end wall of the first end of the reverse cam groove and to move to the second end of the reverse cam groove when the shift drum is rotated in the second direction.

9. A transmission assembly according to claim 8, wherein said inclined guide surface is formed at end portion of the reverse stopper arm.

10. A transmission assembly according to claim 6, wherein said reverse stopper arm comprises an engaging surface, said engaging surface coming in contact with and engages with the second end of the reverse cam groove when the shift drum is rotated in said first direction for establishing said neutral position.

11. A transmission assembly according to claim 6, wherein when the reverse stopper arm is engaged with the second end of the reverse cam groove when the shift drum is in the neutral position, where none of the reverse or forward gears are engaged.

12. A transmission assembly according to claim 6, wherein a circumferential length of the reverse cam groove is greater than a circumferential distance between end walls of said first end and said second end of the reverse cam groove.

13. A power unit comprising:
  an engine having a crankshaft;
  a first main shaft, a second main shaft and a counter shaft each operatively connected with said crankshaft;
  a first gear, a third gear, and a fifth gear disposed between the first main shaft and the counter shaft;
  a second gear, a fourth gear, and a reverse gear disposed between the second main shaft and the counter shaft;
  a shift drum operable to rotate in a first direction and a second direction opposite to said first direction so as to engage a selected one of said first, second, third, fourth, fifth and reverse gears;
  the shift drum having a reverse cam groove formed on an outer periphery thereof, and extending in a circumferential direction of the shift drum; said reverse cam groove having a first end and a second end situated at positions spaced in the circumferential direction of the shift drum;
  the shift drum further having a lead groove provided at the outer periphery thereof configured so as to continue in excess of one circumference of the shift drum, with both ends of the lead groove offset in a direction along an axis of the shift drum; and
  a reverse stopper arm urged by a torsion spring into the reverse cam groove;
  wherein in order to engage the reverse gear when the reverse gear is not engaged, the reverse stopper arm must be detached from the first end of the reverse cam groove by applying a counter acting external force to the reverse stopper arm while the shift drum is rotated in said first direction;
  wherein the shift drum is set in such a manner that at a common speed change position, in which both the fifth gear and the reverse gear are capable of becoming engaged, the reverse stopper arm fits into said first end of the reverse cam groove;
  and wherein in order to disengage the reverse gear when the reverse gear is engaged, while the shift drum is rotated in said second direction, the reverse stopper arm is operable to surmount an outer periphery of the shift drum without requiring external force being applied to the reverse stopper arm.

14. A power unit according to claim 13, wherein said reverse stopper arm comprises an inclined guide surface formed on an end portion the reverse stopper arm, said inclined guide surface enabling the reverse stopper arm to surmount an end wall of the first end of the reverse cam groove and to move to the second end of the reverse cam groove when the shift drum is rotated in the second direction.

15. A power unit according to claim 13, wherein a circumferential length of the reverse cam groove is greater than a circumferential distance between end walls of said first end and said second end of the reverse cam groove.

16. A power unit according to claim 13, wherein said reverse stopper arm comprises an engaging surface, said engaging surface comes in contact with and engages with the second end of the reverse cam groove when the shift drum is rotated in said first direction.

17. A power unit according to claim 13, wherein the reverse stopper arm is engaged with the second end of the reverse cam groove when the shift drum is in a neutral position where none of the reverse gear and the plurality of forward gears are engaged.

18. A power unit according to claim 13, wherein the reverse cam groove extends substantially linearly in the circumferential direction of the shift drum.

* * * * *